United States Patent
Saine

(10) Patent No.: US 10,610,882 B2
(45) Date of Patent: Apr. 7, 2020

(54) APPLICATOR WITH DIVERTER PLATE

(71) Applicant: NORDSON CORPORATION, Westlake, OH (US)

(72) Inventor: Joel E. Saine, Dahlonega, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 16/045,743

(22) Filed: Jul. 26, 2018

(65) Prior Publication Data

US 2018/0326448 A1 Nov. 15, 2018

Related U.S. Application Data

(63) Continuation of application No. 15/698,216, filed on Sep. 7, 2017, now Pat. No. 10,040,092.

(Continued)

(51) Int. Cl.
*B05C 11/10* (2006.01)
*B05C 5/02* (2006.01)
(Continued)

(52) U.S. Cl.
CPC ...... *B05C 11/1007* (2013.01); *B05B 11/3049* (2013.01); *B05B 15/65* (2018.02); *B05C 5/02* (2013.01); *B05C 5/0225* (2013.01); *B05C 5/0279* (2013.01); *B05C 11/025* (2013.01); *B05C 11/1026* (2013.01); *B05C 11/1042* (2013.01); *B05C 11/1044* (2013.01); *B05C 19/008* (2013.01); *B01F 5/108* (2013.01);
(Continued)

(58) Field of Classification Search
USPC ......................................................... 156/578
See application file for complete search history.

(56) References Cited

U.S. PATENT DOCUMENTS

| 5,228,594 | A | 7/1993 | Aslin |
| 5,236,641 | A | 8/1993 | Allen et al. |

(Continued)

FOREIGN PATENT DOCUMENTS

| DE | 4121792 A1 | 1/1993 |
| DE | 202004001480 U1 | 4/2004 |

(Continued)

OTHER PUBLICATIONS

ISA/220—Notification of Transmittal or Search Report and Written Opinion of the ISA, or the Declaration dated Jan. 8, 2018 for WO Application No. PCT/US17/050380.

(Continued)

*Primary Examiner* — Sing P Chan
(74) *Attorney, Agent, or Firm* — Baker & Hostetler LLP

(57) ABSTRACT

An applicator for dispensing multiple adhesives on a substrate is disclosed. The applicator includes a manifold that includes a first dispensing module and a second dispensing module. The first dispensing module has a first inlet and a first nozzle. The first inlet receives a first adhesive and the first nozzle applies the first adhesive to the substrate. The second dispensing module is adjacent the first dispensing module and has a second inlet and a second nozzle. The second inlet receives a second adhesive that is different from the first adhesive. The second nozzle applies the second adhesive to the substrate.

18 Claims, 19 Drawing Sheets

Related U.S. Application Data

(60) Provisional application No. 62/385,238, filed on Sep. 8, 2016.

(51) Int. Cl.

| | | |
|---|---|---|
| *B05B 15/65* | (2018.01) | |
| *B05B 11/00* | (2006.01) | |
| *B05C 19/00* | (2006.01) | |
| *B01F 5/10* | (2006.01) | |
| *B01F 5/14* | (2006.01) | |
| *F04B 49/20* | (2006.01) | |
| *F04D 15/00* | (2006.01) | |
| *B05B 9/04* | (2006.01) | |
| *B05C 5/00* | (2006.01) | |
| *B32B 37/12* | (2006.01) | |
| *F04C 14/08* | (2006.01) | |
| *B05C 11/02* | (2006.01) | |

(52) U.S. Cl.
CPC ............... *B01F 5/14* (2013.01); *B05B 9/0403* (2013.01); *B05C 5/001* (2013.01); *B05C 5/027* (2013.01); *B05C 5/0258* (2013.01); *B05C 11/1002* (2013.01); *B05C 11/1039* (2013.01); *B32B 37/1284* (2013.01); *F04B 49/20* (2013.01); *F04C 14/08* (2013.01); *F04D 15/0066* (2013.01)

(56) References Cited

U.S. PATENT DOCUMENTS

| | | | |
|---|---|---|---|
| 5,409,642 | A | 4/1995 | Allen et al. |
| 5,620,315 | A | 4/1997 | Pfuhler |
| 5,632,938 | A | 5/1997 | Buehning |
| 5,727,933 | A | 3/1998 | Laskaris et al. |
| 5,862,986 | A | 1/1999 | Bolyard et al. |
| 6,089,413 | A | 7/2000 | Riney et al. |
| 6,210,141 | B1 | 4/2001 | Allen |
| 6,296,463 | B1 | 10/2001 | Allen |
| 6,422,428 | B1 | 7/2002 | Allen et al. |
| 6,517,891 | B1 | 2/2003 | Estelle et al. |
| 6,607,104 | B2 | 8/2003 | Mcguffey |
| 6,688,498 | B1 | 2/2004 | Mcguffey |
| 7,699,243 | B2 | 4/2010 | Starke |
| 7,908,997 | B2 | 3/2011 | Lessley et al. |
| 8,445,061 | B2 | 5/2013 | Mcguffey |
| 8,561,656 | B2 | 10/2013 | Eginton et al. |
| 9,126,222 | B2 | 9/2015 | Mcguffey |
| 9,415,415 | B1 | 8/2016 | Jones |
| 9,427,766 | B2 | 8/2016 | Varga |
| 9,573,159 | B2 | 2/2017 | Mcguffey |
| 9,889,599 | B2 | 2/2018 | Ayers |
| 9,925,552 | B2 | 3/2018 | Saine |
| 2001/0024618 | A1 | 9/2001 | Winmill |
| 2002/0102324 | A1 | 8/2002 | Groleau |
| 2002/0139818 | A1 | 10/2002 | Mcguffey |
| 2003/0062384 | A1 | 4/2003 | Mcguffey |
| 2004/0099752 | A1 | 5/2004 | Boger |
| 2004/0124251 | A1 | 7/2004 | Gressett et al. |
| 2004/0159672 | A1 | 8/2004 | Auber et al. |
| 2005/0230423 | A1 | 10/2005 | Riney et al. |
| 2005/0242108 | A1 | 11/2005 | Harris et al. |
| 2005/0274317 | A1 | 12/2005 | De et al. |
| 2006/0182887 | A1 | 8/2006 | Miller |
| 2008/0135650 | A1 | 6/2008 | Starke |
| 2009/0266844 | A1 | 10/2009 | Mcguffey |
| 2012/0048447 | A1 | 3/2012 | Burmester et al. |
| 2013/0108494 | A1 | 5/2013 | Varga |
| 2015/0190837 | A1 | 7/2015 | Burmester et al. |
| 2015/0352588 | A1 | 12/2015 | Lessley et al. |
| 2016/0256889 | A1 | 9/2016 | Jones |
| 2016/0303597 | A1 | 10/2016 | Mcguffey |
| 2017/0072624 | A1* | 3/2017 | Ayers ................. B29C 65/4815 |
| 2017/0097019 | A1 | 4/2017 | Afshari |
| 2017/0146035 | A1 | 5/2017 | Afshari |
| 2018/0065137 | A1 | 3/2018 | Saine |
| 2018/0065139 | A1 | 3/2018 | Saine |
| 2018/0065140 | A1 | 3/2018 | Saine et al. |

FOREIGN PATENT DOCUMENTS

| | | | |
|---|---|---|---|
| EP | 1442798 | A2 | 8/2004 |
| EP | 2289633 | A2 | 3/2011 |
| EP | 3064279 | A1 | 9/2016 |
| EP | 3064280 | A1 | 9/2016 |
| JP | 09-173917 | A | 7/1997 |
| WO | 93/05212 | A2 | 3/1993 |
| WO | 99/54044 | A1 | 10/1999 |
| WO | 99/54055 | A1 | 10/1999 |
| WO | 2007/084891 | A2 | 7/2007 |
| WO | 2011/008390 | A1 | 1/2011 |
| WO | 2011/025603 | A1 | 3/2011 |

OTHER PUBLICATIONS

ISA/220—Notification of Transmittal or Search Report and Written Opinion of the ISA, or the Declaration dated Dec. 20, 2017 for WO Application No. PCT/US17/050373.

ISA/220—Notification of Transmittal or Search Report and Written Opinion of the ISA, or the Declaration dated Dec. 20, 2017 for WO Application No. PCT/US17/050368.

International Patent Application No. PCT/US2017/050406; Int'l Search Report and the Written Opinion; dated Mar. 19, 2018; 19 pages.

English Translation of International Preliminary Report on Patentability Chapter II or English Translation of International Preliminary Report on Patentability Chapter I dated Dec. 13, 2018 for WO Application No. PCT/US17/050417.

(IPEA/409) International Preliminary Report on Patentability Chapter II or (IB/373) International Preliminary Report on Patentability Chapter I dated Mar. 21, 2019 for WO Application No. PCT/US17/050509.

(IPEA/408) Written opinion under Chapter II dated Aug. 3, 2018 for WO Application No. PCT/US17/050417.

(IPEA/409) International Preliminary Report on Patentability Chapter II or (IB/373) International Preliminary Report on Patentability Chapter I dated Mar. 21, 2019 for WO Application No. PCT/US17/050368.

(IPEA/409) International Preliminary Report on Patentability Chapter II or (IB/373) International Preliminary Report on Patentability Chapter I dated Mar. 21, 2019 for WO Application No. PCT/US17/050373.

(IPEA/409) International Preliminary Report on Patentability Chapter II or (IB/373) International Preliminary Report on Patentability Chapter I dated Mar. 21, 2019 for WO Application No. PCT/US17/050380.

(IPEA/409) International Preliminary Report on Patentability Chapter II or (IB/373) International Preliminary Report on Patentability Chapter I dated Mar. 21, 2019 for WO Application No. PCT/US17/050406.

English Translation of International Preliminary Report on Patentability Chapter II or English Translation of International Preliminary Report on Patentability Chapter I dated Mar. 21, 2019 for WO Application No. PCT/US17/050368.

English Translation of International Preliminary Report on Patentability Chapter II or English Translation of International Preliminary Report on Patentability Chapter I dated Mar. 21, 2019 for WO Application No. PCT/US17/050373.

\* cited by examiner

APPLICATOR WITH DIVERTER PLATE

CROSS REFERENCE TO RELATED APPLICATIONS

This application is a continuation of U.S. patent application Ser. No. 15/698,216, filed Sep. 7, 2017, and published as U.S. Patent App. Pub. No. 2018/0065139 on Mar. 8, 2018, which claims the benefit of U.S. Provisional Patent App. No. 62/385,238, filed Sep. 8, 2016, the disclosures of which are hereby incorporated by reference herein.

TECHNICAL FIELD

The present invention relates to applicators for pumping an adhesive to a dispensing module. More particularly, this invention relates to the routing of adhesive flow between individual pump assemblies and dispensing modules.

BACKGROUND

Typical applicators for dispensing adhesive may include positive displacement fluid dispensers that intermittently apply a flow of adhesive to a substrate. Different dispensing operations may require the fluid dispensers to apply adhesive to the substrate at a unique combination of flow rates and in unique patterns. For example, in the production of diapers, a change in production of one size of diaper to another size can require an applicator to produce different adhesive patterns within a particular diaper. As a result, when the applicator has finished one dispensing operation and a new dispensing operation is to be commenced, applicators must traditionally be at least partially disassembled and rearranged to achieve the desired adhesive flow conditions for the new dispensing operation. This can be a time intensive process that prolongs the time that an applicator is non-operational between dispensing operations. As subsequent dispensing operations are performed, an operator of the applicator may also become mistaken as to the particular configuration of the pump assemblies and fluid dispensers at a given time, leading to operation of the applicator in an unintended configuration for a particular dispensing operation.

Additionally, typical applicators can be configured to pump adhesive from pump assemblies to fluid dispensers in a one-to-one relationship, i.e., each pump assembly pumps adhesive to a single fluid dispenser, and each fluid dispenser receives adhesive from only one pump assemblies. Typical applicators can also be configured such that a flow of adhesive from a particular pump assembly is split to supply multiple fluid dispensers, which can increase the operational flexibility of a particular applicator. Due to changed requirements in adhesive pattern location, it can become necessary to divert or split pump assembly flow to different fluid dispensers. However, without influencing the position of adjacent fluid dispensers or pump assemblies along the applicator, the ability to split or divert pump assembly flow is limited. Additionally, when splitting the adhesive flow from a single pump assembly, metering accuracy is diminished across each of the flow channels, which can lead to undesirable dispensing conditions.

Therefore, there is a need for an applicator in which adhesive flow between the pump assemblies and fluid dispensers can be rerouted quickly with minimal disassembly of the applicator and delay in applicator operation.

SUMMARY

An embodiment of the present invention includes an applicator for dispensing an adhesive. The applicator includes a plurality of pump assemblies each having an inlet and an outlet, a plurality of dispensing modules each having an inlet in fluid communication with the outlet of at least one of the plurality of pump assemblies, and a supply channel for receiving the adhesive, the supply channel being in fluid communication with the inlets of the plurality of pump assemblies. The applicator includes a flow diverter plate in fluid communication with the plurality of pump assemblies, wherein the flow diverter plate defines a body having a first surface in fluid communication with the plurality of pump assemblies, a second surface opposite the first surface in fluid communication with the plurality of dispensing modules, a pump channel extending from the first surface to the second surface, and a plurality of diverter passages extending from the first surface to the second surface. Each of the diverter passages has a first opening on the first surface and a second opening on the second surface, and the pump channel has a third opening on the second surface and a fourth opening on the first surface. The first opening of each of the diverter passages is in fluid communication with the outlet of one of the plurality of pump assemblies, the second opening of each of the diverter passages is in fluid communication with the inlet of at least one of the dispensing modules, the third opening of the pump channel is in fluid communication with the supply channel, the fourth opening of the pump channel is in fluid communication with the inlet of one of the plurality of pump assemblies, and one of the plurality of diverter passages is in fluid communication with another of the plurality of diverter passages.

A further embodiment of the present invention includes a method of diverting flow in an applicator. The method includes positioning a flow diverter plate in fluid communication with a pump assembly having an outlet and with a dispensing module having an inlet, and flowing an adhesive out of the outlet of the pump assembly and into a first opening of a diverter passage defined within a body of a flow diverter plate. The method includes moving the adhesive through the diverter passage, the diverter passage including a second opening in fluid communication with the inlet of the dispensing module, such that the adhesive exits at the second opening of the diverter passage, and flowing the adhesive from the second opening of the diverter passage into the inlet of the dispensing module.

BRIEF DESCRIPTION OF THE DRAWINGS

The foregoing summary, as well as the following detailed description, will be better understood when read in conjunction with the appended drawings. The drawings show illustrative embodiments of the invention. It should be understood, however, that the application is not limited to the precise arrangements and instrumentalities shown.

DETAILED DESCRIPTION

Figure 1:
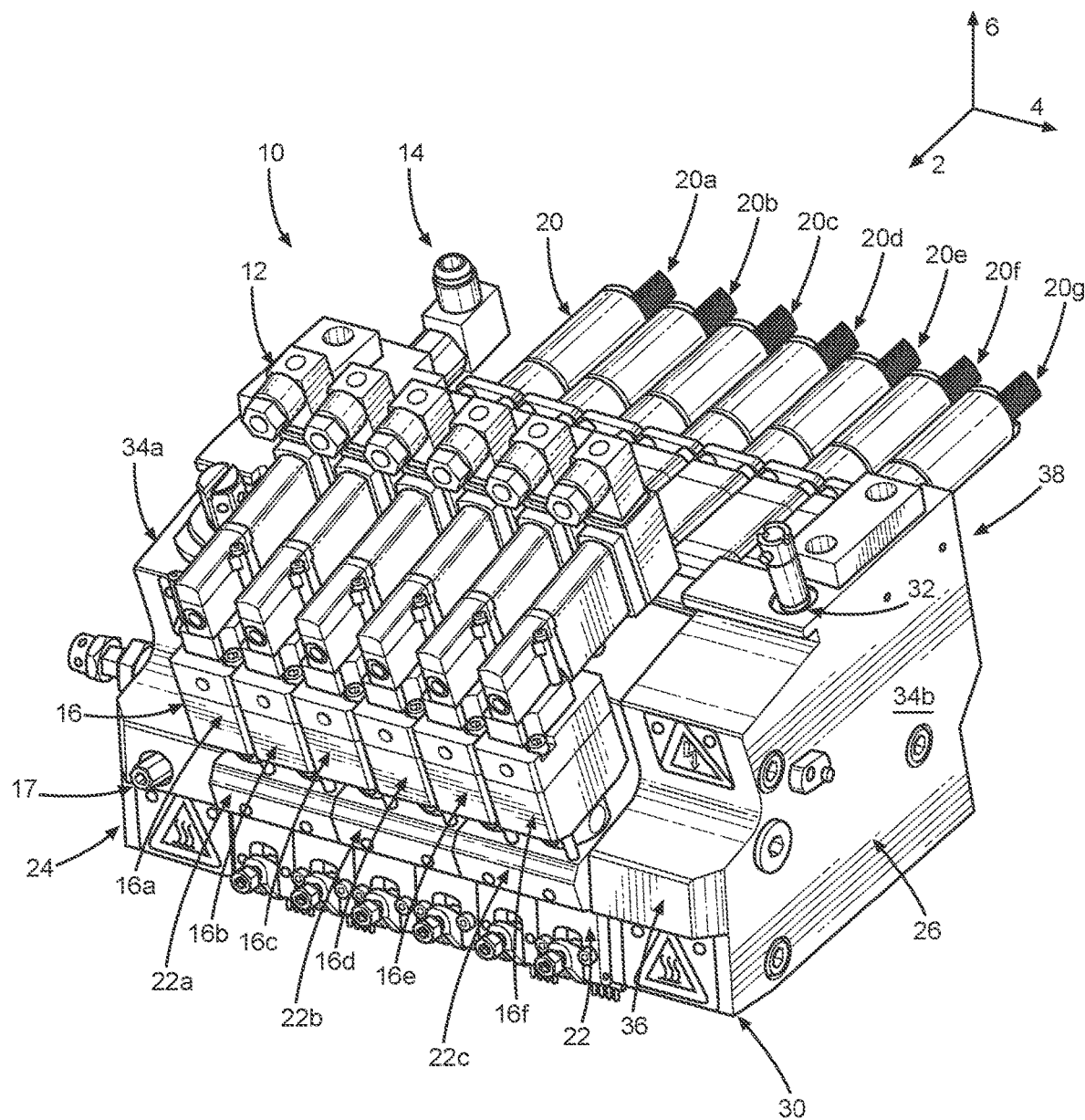
FIG. 1 is a front perspective view of an applicator according to an embodiment of the present invention.

An applicator 10 includes dispensing modules 16a-16f, pump assemblies 20a-20g, and a diverter plate 208 (best shown in FIG. 15-17C) or 400 (best shown in FIGS. 18-20B) that is removably attached to the applicator 10. The diverter plate 208 includes a plurality of passages and channels that direct adhesive from the supply channel 200, to the pump assemblies 20a-20f, and to the dispensing modules 16a-16f. Certain terminology is used to describe the applicator 10 in the following description for convenience only and is not limiting. The words "right," "left," "lower," and "upper" designate directions in the drawings to which reference is made. The words "inner" and "outer" refer to directions toward and away from, respectively, the geometric center of the description to describe the applicator 10 and related parts thereof. The words "forward" and "rearward" refer to directions in a longitudinal direction 2 and a direction opposite the longitudinal direction 2 along the applicator 10 and related parts thereof. The terminology includes the above-listed words, derivatives thereof, and words of similar import.

Unless otherwise specified herein, the terms "longitudinal," "lateral," and "vertical" are used to describe the orthogonal directional components of various components of the applicator 10, as designated by the longitudinal direction 2, lateral direction 4, and vertical direction 6. It should be appreciated that while the longitudinal and lateral directions 2 and 4 are illustrated as extending along a horizontal plane, and the vertical direction 6 is illustrated as extending along a vertical plane, the planes that encompass the various directions may differ during use.

Embodiments of the present invention include an applicator 10 for dispensing adhesive onto a substrate during product manufacturing. Referring to FIGS. 1-5, the applicator 10 includes a manifold 12. The applicator 10 has a top surface 32, a bottom surface 30 opposite the top surface 32 along the vertical direction 6, a first side surface 34a, a second side surface 34b opposite the first side surface 34a along the lateral direction 4, a front surface 36, and a back surface 38 opposite the front surface 36 along the longitudinal direction 2. The first and second side surfaces 34a and 34b extend from the front surface 36 to the back surface 38, as well as from the bottom surface 30 to the top surface 32. The manifold 12 is defined by a first end plate 24, a second end plate 26, and at least one manifold segment 22 disposed between the first and second end plates 24 and 26. As a result, the first and second end plates 24 and 26 are spaced apart along the lateral direction 4. The first and second end plates 24 and 26 and the manifold segments 22 may be releasably connected such that manifold segments 22 may be added or taken away from the applicator 10 as operating conditions require. As a result, even though FIGS. 1-5 show the applicator 10 as including three manifold segments 22a-22c, the applicator 10 can include more or less manifold segments 22 may as desired. However, in another embodiment, the manifold 12 may be a unitary manifold.

Figure 2:
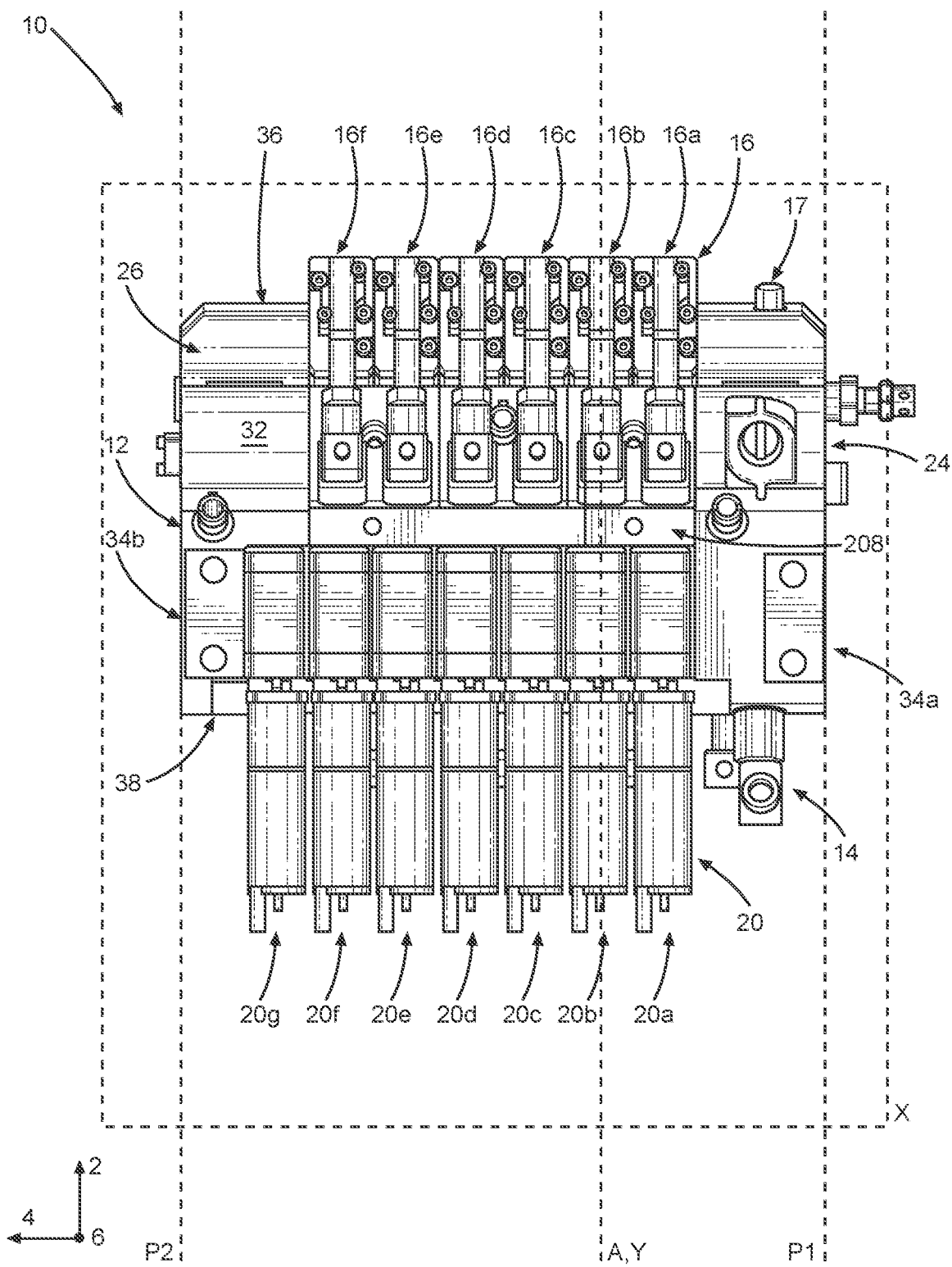
FIG. 2 is a top view of the applicator shown in FIG. 1.
Figure 3:
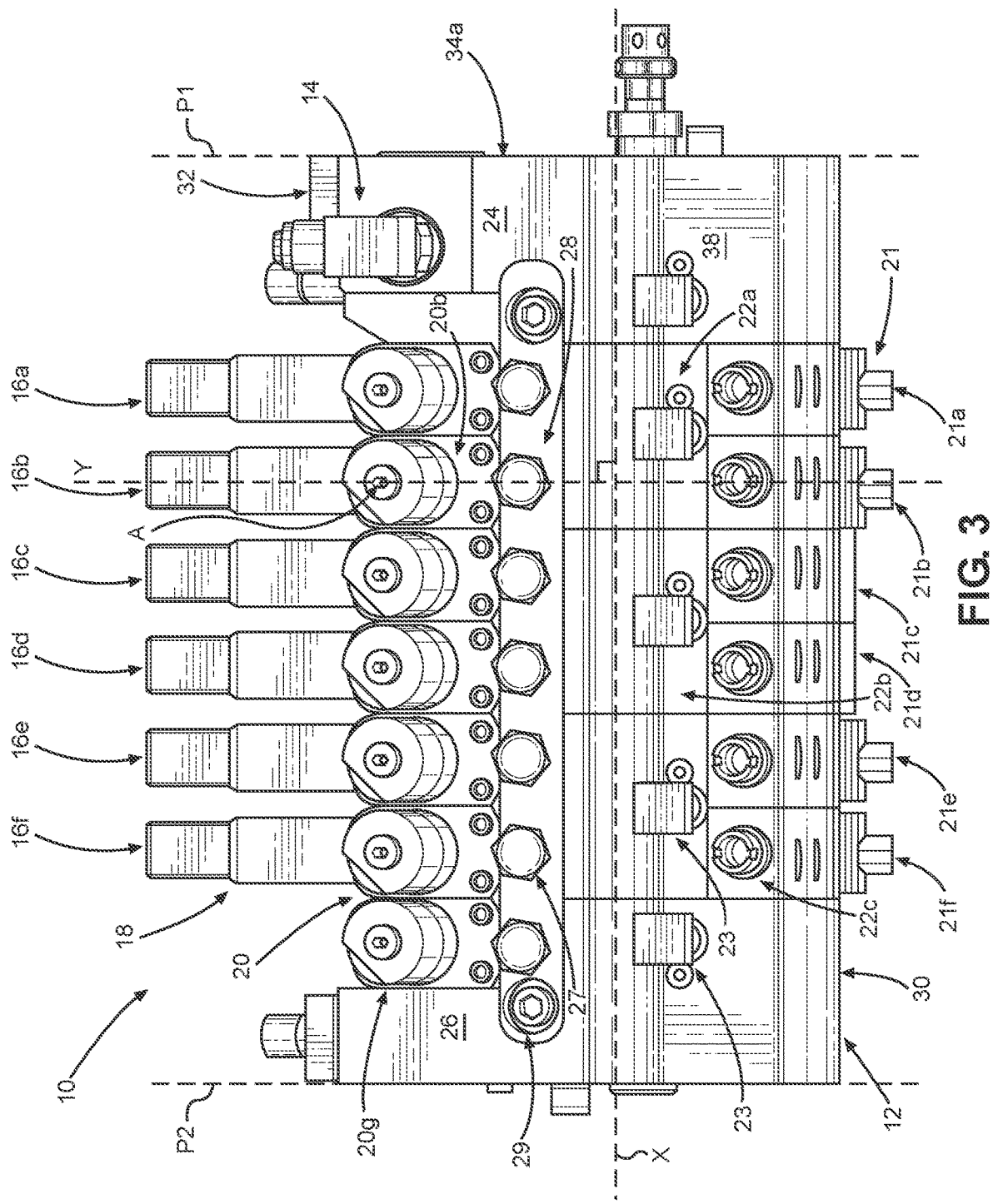
FIG. 3 is a rear view of the applicator shown in FIG. 1.
Figure 4:
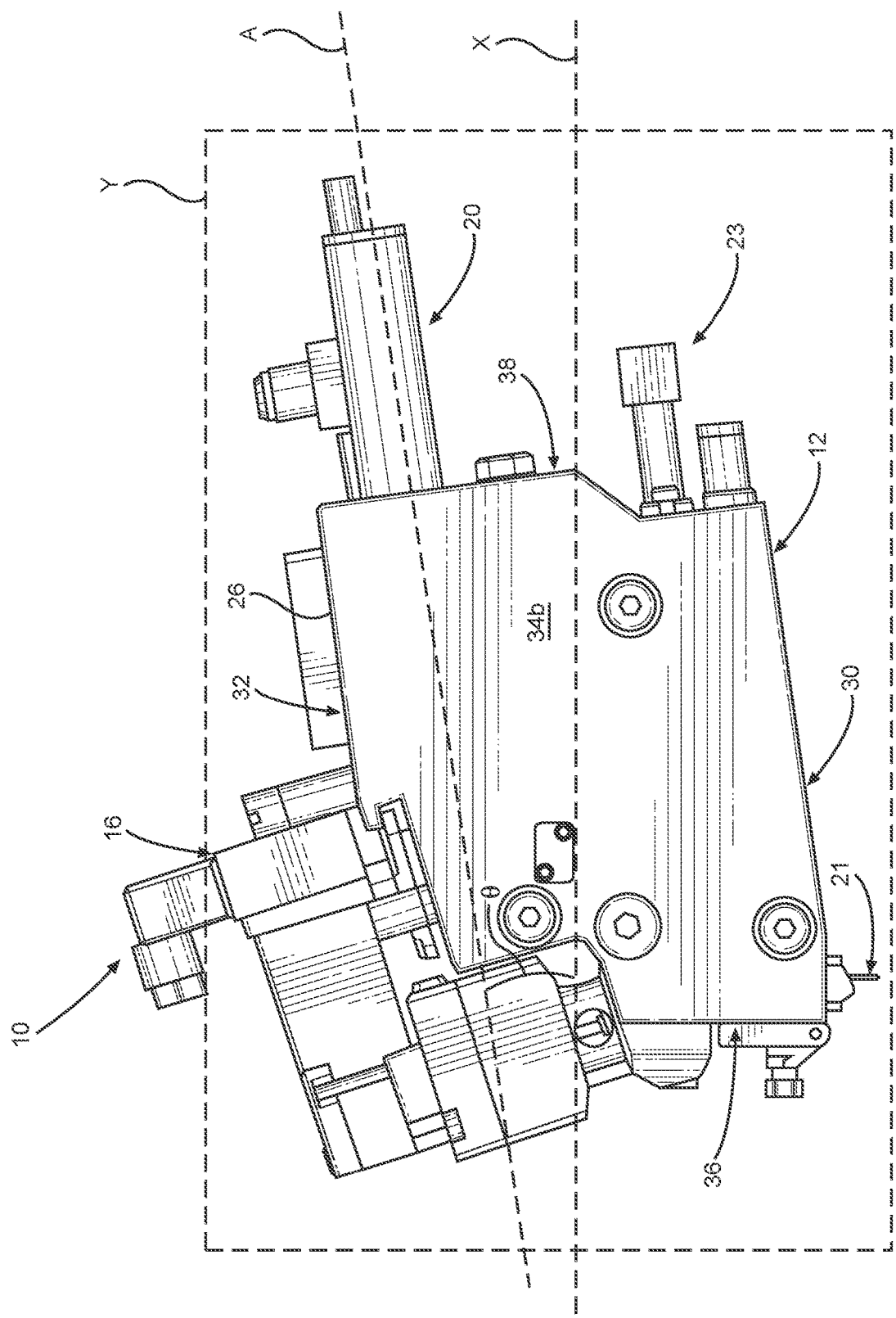
FIG. 4 is a side view of the applicator shown in FIG. 1.

Referring to FIGS. 2-4, the first side surface 34a of the manifold 12 lies within a first plane P1, while the second side surface 34b lies within a second plane P2. The second plane P2 may be parallel to the first plane P1. However, the first and second planes P1 and P2 may not be parallel if the first and second side surfaces 34a and 34b are angled with respect to each other. The applicator 10 defines a horizontal plane X, such that the lateral and longitudinal directions 4 and 2 lie within the horizontal plane X. The pump assembly 20 may define a drive shaft axis A that lies within a plane Y. The interrelationship of these planes and axes will be described further below.

The applicator 10 includes an input connector 14, through which adhesive is pumped into the manifold 12. The manifold 12 may further include a pressure release valve 17 that allows a user to attenuate pressure created by adhesive within the manifold, and a dispensing module 16 for applying the adhesive to a substrate. When the pressure release valve 17 is opened, adhesive may drain from the manifold through a drain (not shown). The applicator 10 also includes a pump assembly 20 removably mounted to the manifold 12. The pump assembly 20 pumps adhesive flowing from an interior channel of the manifold 12 to the dispensing module 16, which then dispenses adhesive out of the applicator through a nozzle 21. The applicator 10 may include thermal elements 23 that are configured to elevate the temperature of the manifold 12, which, in turn, elevates the temperature of the pump 40 in each pump assembly 20. Though FIGS. 1-5 depict the applicator 10 as including five thermal elements 23a-23e, any number of thermal elements 23 can be included as required.

In various embodiments, the applicator 10 includes multiple sets of pump assemblies 20, dispensing modules 16, and nozzles 21. As illustrated in FIGS. 1-5, for example, the applicator 10 is depicted as including seven pump assemblies 20a, 20b, 20c, 20d, 20e, 20f, and 20g. Although FIGS. 1-5 illustrate seven pump assemblies 20a-20g, the applicator 10 can include any number of pump assemblies 20 as desired. For example, the applicator 10 can include two pump assemblies, three pump assemblies, or more than three pump assemblies. The pump assemblies 20a-20g may be arranged in a side-by-side configuration to increase the processing width of the applicator 10. For clarity, a single pump assembly 20 is described below. However, reference number 20 can be used interchangeably with reference numbers 20a-20g.

Additionally, the applicator 10 is depicted as including six dispensing modules 16a, 16b, 16c, 16d, 16e, and 16f. Although FIGS. 1-3 illustrate six dispensing modules 16a-16f, the applicator can include any number of dispensing modules 16 as desired. For example, the applicator 10 can include one dispensing module, two dispensing modules, or more than two dispensing modules. Similarly, a single dispensing module 16 is described below. However, the reference number 16 can be used interchangeably with reference numbers 16a-16f. The applicator 10 is also depicted as including four nozzles 21a, 21b, 21c, and 21d. Each of nozzles 21a-21d may receive an adhesive feed from a corresponding dispensing module 16, or a combination of several of the dispensing modules 16a-16f The configuration of the nozzles 21a-21d can be changed by a user as operation conditions require, which can include adding additional nozzles 21 or removing any of the nozzles 21a-21d that are already coupled to the applicator 10.

Continuing with FIGS. 1-5, each of pump assemblies 20a-20f may be associated with a corresponding one of the dispensing modules 16a-16f In operation, each of pump assemblies 20a-20f may pump fluid that is supplied by the manifold 12 to the corresponding one of the dispensing modules 16a-16f, such that the dispensing modules 16a-16f apply the adhesive to a given substrate through nozzles 21a-21d. However, each dispensing module 16 may not correspond to a single pump assembly 20, such that multiple pump assemblies 20 pump adhesive to a single dispensing module 16. Additionally, each of the pump assemblies 20 and each of the dispensing modules 16 may be coupled to and associated with a respective manifold segment 22. However, two or more pump assemblies 20 and/or two or more dispensing modules 16 may be coupled to a single manifold segment 22.

Figure 5:
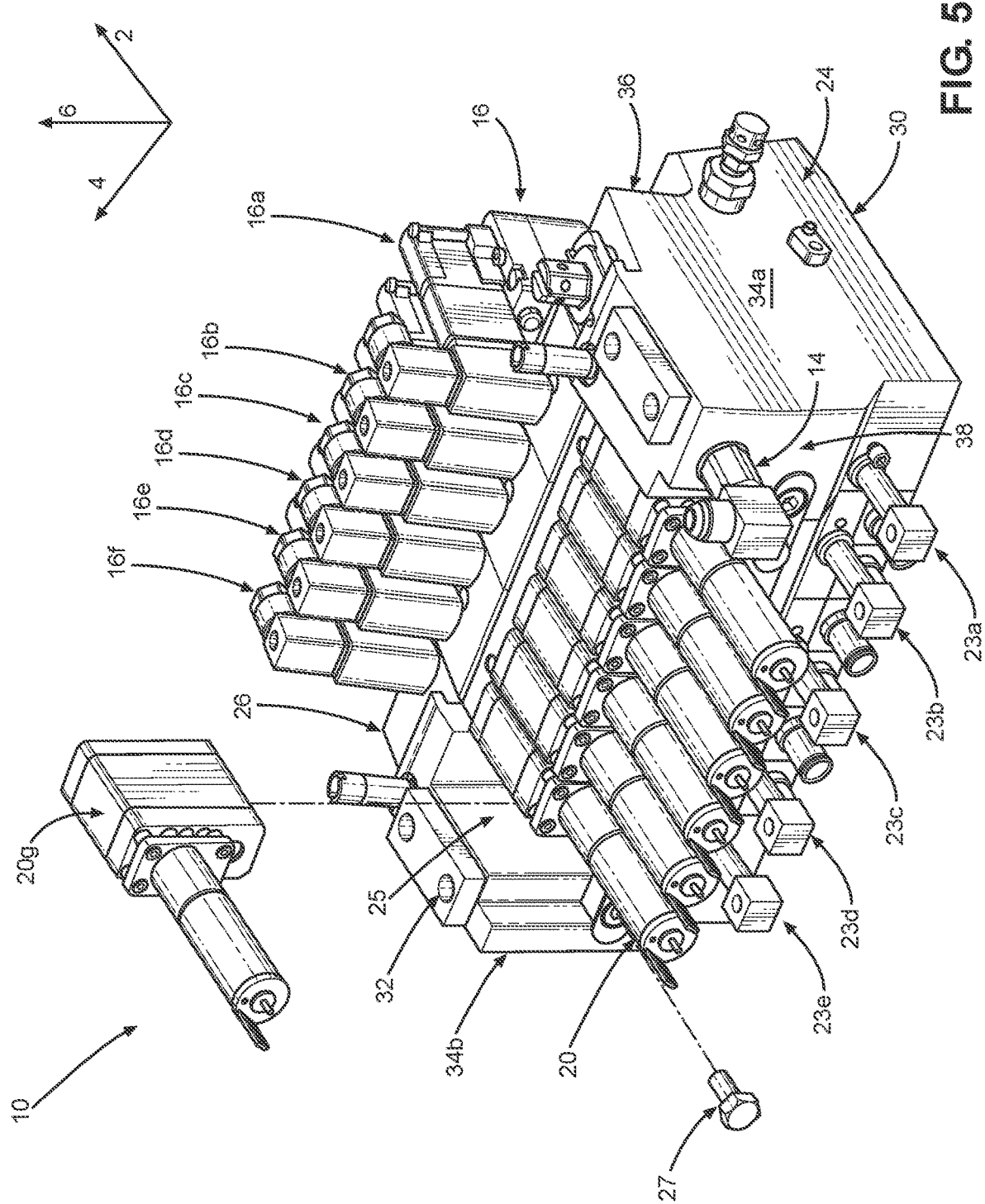
FIG. 5 is a rear perspective view of the applicator shown in FIG. 1, with a pump assembly removed from the applicator.
Figure 6:
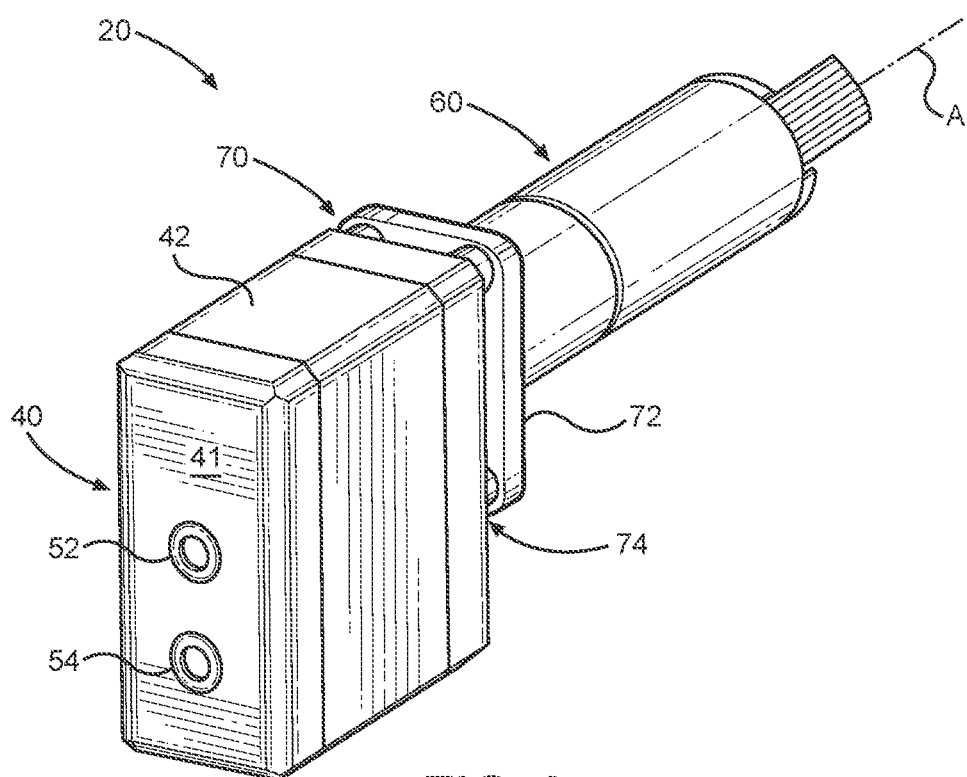
FIG. 6 is a bottom perspective view of a pump assembly used in the applicator shown in FIG. 1.
Figure 7:
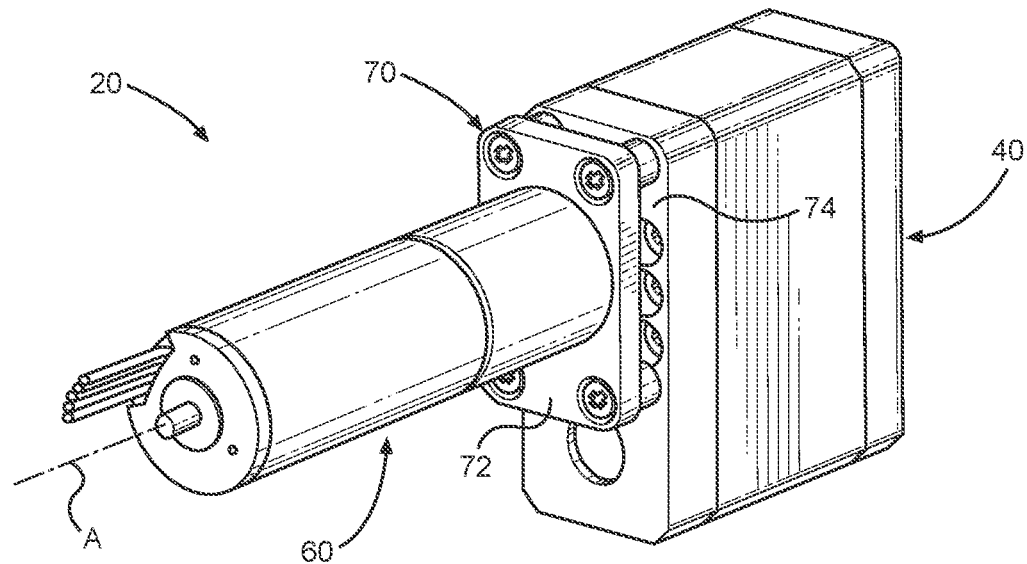
FIG. 7 is a top perspective view of the pump assembly shown in FIG. 6.
Figure 8:
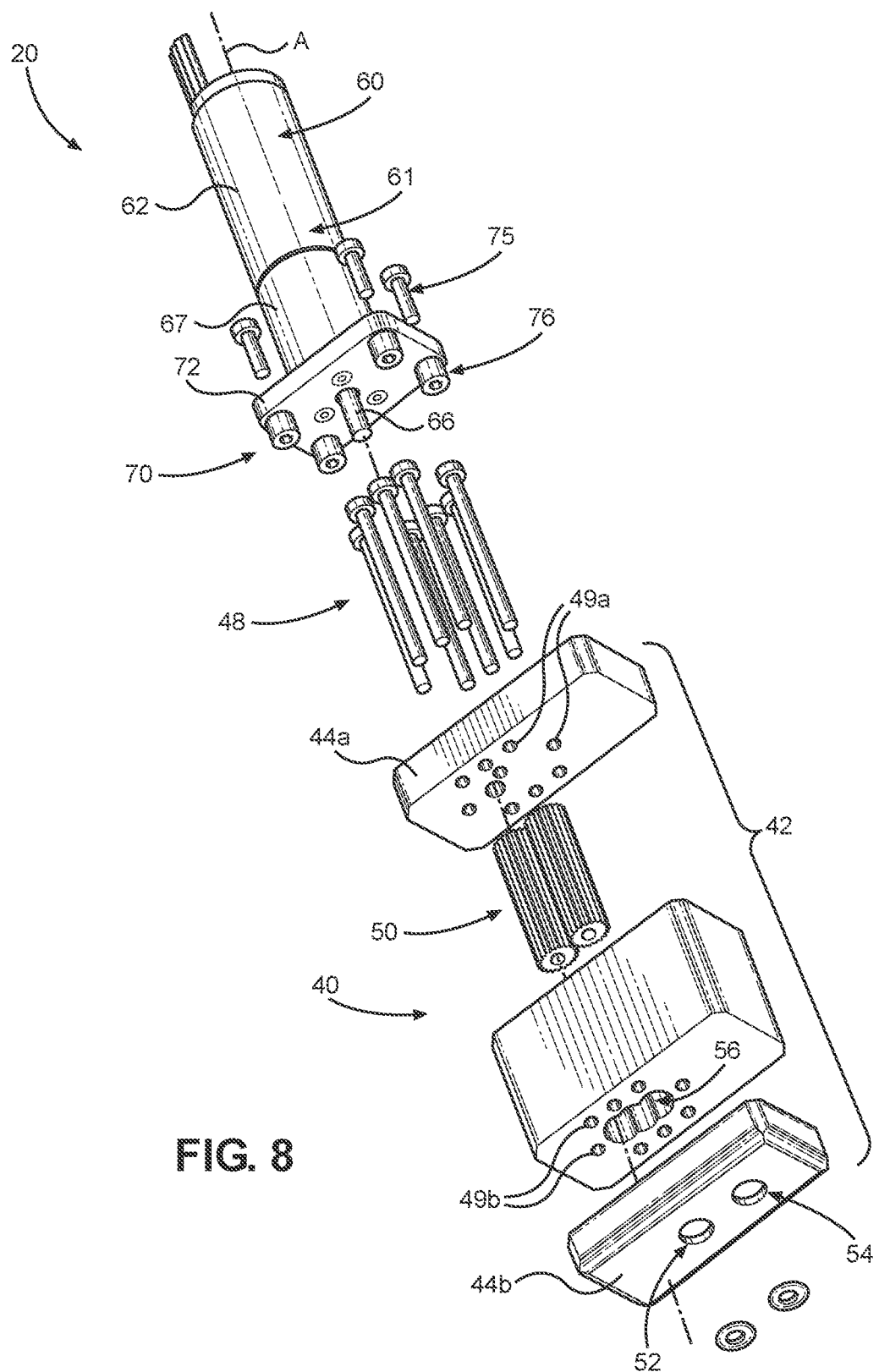
FIG. 8 is an exploded view of the pump assembly shown in FIG. 6.
Figure 9:
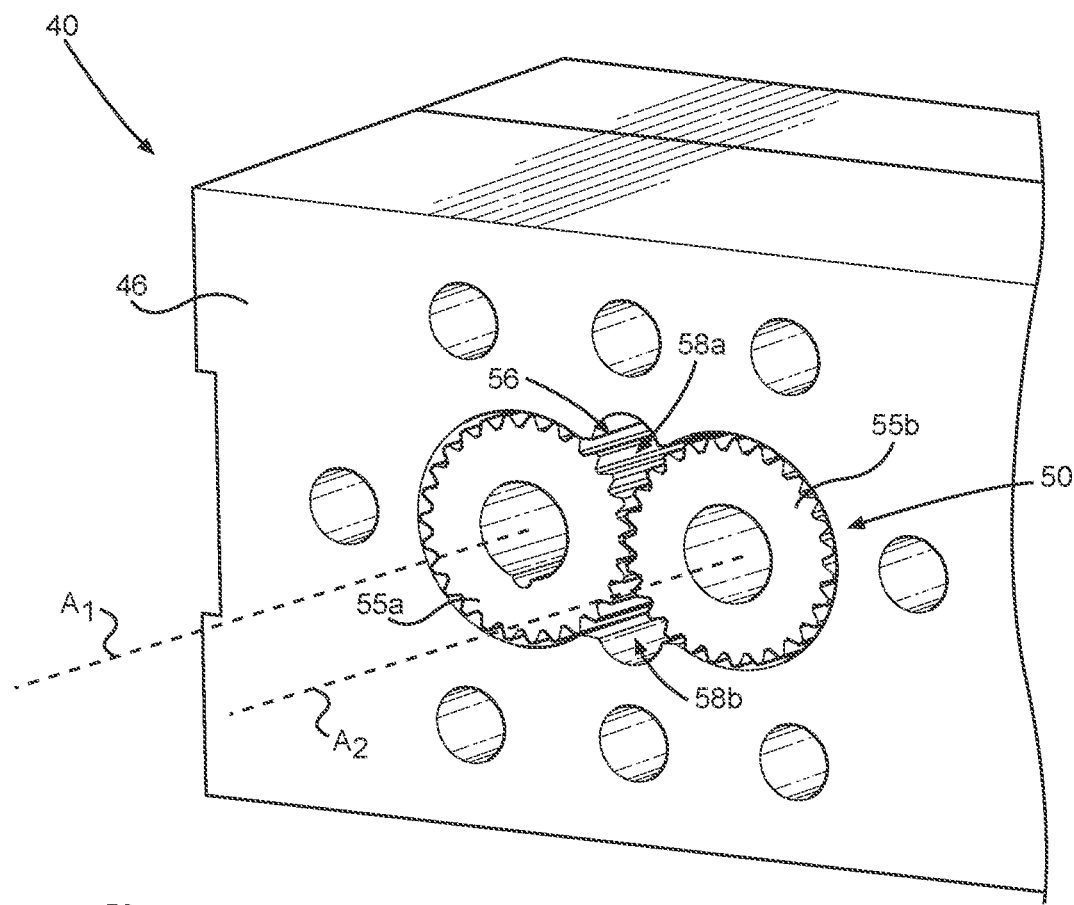
FIG. 9 is a sectional view of the pump assembly shown in FIG. 6.

The pump assembly 20g, however, is not associated with a particular dispensing module 16, but is designated as the recirculation pump assembly. The function of the recirculation pump assembly 20g may include pumping the adhesive through a recirculation channel 236, as will be described below. As such, the inlet 52 of the pump assembly 20g is in fluid communication with the recirculation channel 236, and the outlet of the pump assembly 20g is in fluid communication with the supply channel 200. Though the pump assembly 20g is shown as the pump assembly 20 positioned closest to the second side surface 34b, the recirculation pump assembly 20g may be positioned anywhere along the series of pump assemblies 20a-20g. For example, the recirculation pump assembly 20g may be positioned as the pump assembly closest to the first side surface 34a, or at a location in the middle of the pump assemblies 20a-20g. When the pump assembly 20g is positioned as the closest pump to the first or second side surface 34a or 34b of the applicator 10, the particular one of the first or second end plates 24 or 26 that the pump assembly 20g abuts may be configured to receive a portion of the pump assembly 20g. For example, as shown in FIG. 5, the second end plate 26 includes a recess 25 that is sized to receive a housing assembly 42 of the pump assembly 20g. When the pump assembly 20g is disposed in the recess 25, the pump assembly 20g may be substantially in line with the other pump assemblies 20a-20f.

Referring to FIGS. 6-10, each pump assembly 20a-20g includes a pump 40 and a dedicated drive motor unit 60 that powers the pump 40. Because each pump 40 has a dedicated drive motor unit 60, each pump assembly 20 can be independently controlled by the operator and/or a control system (not shown). The pump assembly 20 also includes a thermal isolation region 70 positioned between the pump 40 and the drive motor unit 60. Thermal elements 23 may be used to elevate the temperature of the manifold 12, which, in turn, elevates the temperature of the pump 40 in each pump assembly 20. The thermal isolation region 70 minimizes thermal transfer from the pump 40 to the drive motor unit 60, thereby minimizing the effect of temperature on the electronic components in the drive motor unit 60. Exposing the electronic components in the drive motor unit 60 to a sufficiently elevated temperature may damage the electronic components, which may render the drive motor unit 60 inoperable.

The drive motor unit 60 includes a motor 62, an output drive shaft 66, and one or more connectors (not shown) that are coupled to a power source (not shown). The drive motor unit 60 is coupled to a gear assembly 67, which may include any type of gears as desired that transfer rotational motion from an output drive shaft 66 of the motor to the input drive shaft (not shown) of the pump to attain the desired rotational speed. In one embodiment, the gear assembly 67 includes a planetary gear train. The output drive shaft 66 has a drive axis A about which the drive shaft 66 rotates.

Referring back to FIGS. 2-4, the pump assembly 20 may be mounted to the manifold 12 in a number of different configurations. In one embodiment, the pump assembly 20 is mounted to the manifold 12 so that the bottom surface 41 of the pump 40, which includes an inlet 52 and an outlet 54, faces the manifold 12 at a location that is spaced apart from and located between the first and second side surfaces 34a and 34b. In this configuration, the drive motor axis A does not intersect either the first side surface 34a or the second side surface 34b of the applicator 10. Rather, the pump assembly 20 is positioned on the manifold 12 such that the drive motor axis A of the drive motor unit 60 may lie in a plane Y that is parallel to the first plane P1, in which the first side surface 34a lies, as described above. The plane Y may also be parallel to the second plane P2, in which the second side surface 34b lies. Each pump assembly 20a-20g has a respective axis A that lies within a respective plane that may be parallel to the first plane P1 and/or the second plane P2.

Continuing with FIGS. 3 and 4, the pump assembly 20 is positioned on the manifold 12 such that the drive motor axis A is oriented in any particular direction within plane Y. For example, the pump assembly 20 can be positioned on the manifold 12 such that the drive motor axis A lies within plane Y and is angularly offset with respect to plane X. For instance, the pump assembly 20 can be positioned on the manifold 12 such that the drive motor axis A defines an angle θ with plane X. The angle θ can be any angle as desired. In one embodiment, the angle θ is an acute angle. Alternatively, the angle θ can be an obtuse angle, an angle greater than 180 degrees, or substantially 90 degrees.

Referring to FIGS. 6-10, the pump 40 includes a housing assembly 42 and a gear assembly 50 contained within the housing assembly 42. Alternatively, more than one gear assembly 50 may be contained within the housing assembly 42. The housing assembly 42 further includes an inlet 52 that is configured to receive adhesive from the manifold segment 22, as well as an outlet 54 for discharging adhesive back into the manifold 12. In accordance with the embodiment illustrated in FIGS. 6-10, the inlet 52 and the outlet 54 of the pump 40 are defined by a bottom surface 41 of the pump 40 and are oriented in a direction that is parallel to the drive motor axis A of the drive motor unit 60.

The housing assembly 42 comprises an upper plate 44a, a lower plate 44b, and a central block 46. The upper and lower plates 44a and 44b are spaced from each other along a direction that is aligned with a drive axis A of the drive motor unit 60. The upper plate 44a defines a bottom surface 41, through which the drive axis A may extend. The upper plate 44a, the central block 46, and the lower plate 44b are coupled together with bolts 48. The upper plate 44a has a plurality of bores 49a that are configured to receive the bolts 48, the central block 46 has a plurality of bores 49b that are configured to receive the bolts 48, and the lower plate 44b has a plurality of bores (not shown) that are configured to receive the bolts 48. The bolts 48, bores 49a, and bores 49b may be threaded, such that the bores 49a and 49b are capable of threadedly receiving the bolts 48.

Figure 10:
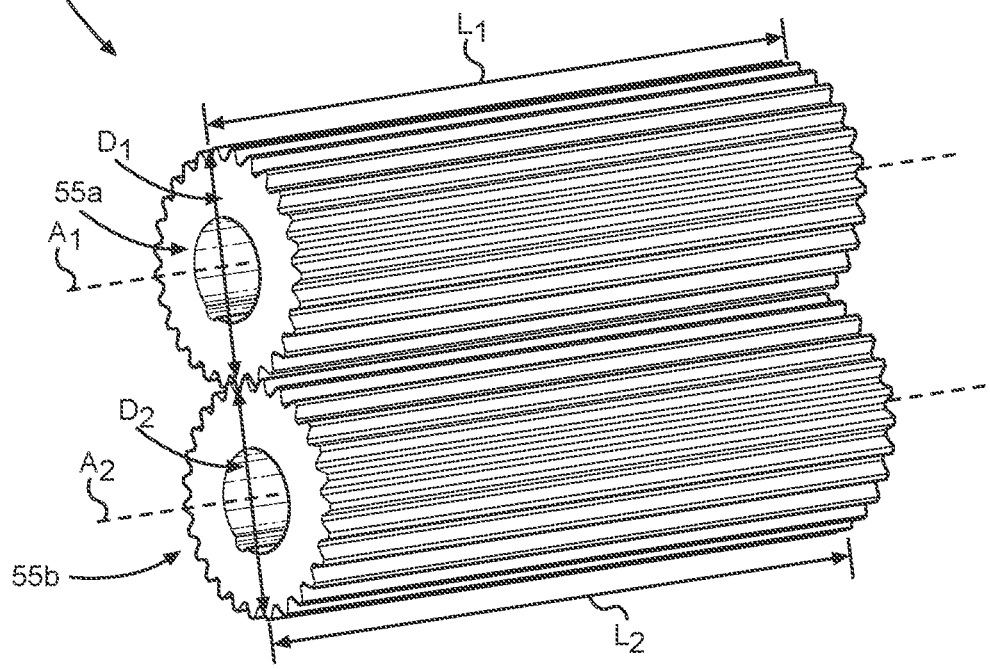
FIG. 10 is a perspective view of a gear assembly used in the pump assembly shown in FIGS. 6-9.

The central block 46 has an internal chamber 56 that is sized to generally conform to the profile of the gear assembly 50. In one embodiment, the gear assembly 50 includes a driven gear 55a and an idler gear 55b, which are known to a person of ordinary skill in the art. The driven gear 55a is coupled to the output drive shaft 66 of the drive motor unit 60 such that rotation of the drive shaft 66 rotates the driven gear 55a, which, in turn, rotates the idler gear 55b. The driven gear 55a rotates about a first axis $A_1$, while the idler gear 55b rotates about a second axis $A_2$. In FIG. 10, the first axis $A_1$ is illustrated as coaxial with the drive motor axis A. However, it is also contemplated that the first axis $A_1$ may be offset from the drive motor axis A. The gear assembly 50 may include an elongate gear shaft (not shown) that is coupled to an end of the output drive shaft 66 via a coupling (not shown). The gear shaft extends into the driven gear 55a, and is keyed to actuate the driven gear 55a. A seal member (not shown), such as a coating and/or an encasement, can be placed around the elongate gear shaft to facilitate sealing of the gear assembly 50.

In use, rotation of the driven gear 55a and the idler gear 55b drives adhesive in the pump 40 from a first section 58a of the chamber 56 to a second section 58b of the chamber 56. The adhesive is then routed from the second section 58b of the chamber 56 to the outlet 54. In accordance with the illustrated embodiment, the driven gear 55a has a diameter $D_1$ and a length $L_1$, where the length $L_1$ may be greater than the diameter $D_1$. Likewise, the idler gear 55b has a diameter $D_2$ and a length $L_2$, where the length $L_2$ may be greater than the diameter $D_2$. While a gear assembly 50 with two gears is shown, the pump can have a gear assembly that has any number of gear configurations to produce the desired flow rate of adhesive through the pump 40. In these configurations, the central block 46 can be segmented to support gear stacking. In one embodiment, a plurality of gear assemblies (not shown) can be stacked along the pump input shaft. In this embodiment, the gear assemblies can have different outputs that are combined into a single output stream. In another embodiment, the gear assemblies have different outputs that can be kept separate to provide multiple outputs through additional porting in the lower plate 44b and the manifold 12.

Continuing with FIGS. 6-10, the thermal isolation region 70 is defined by a thermal isolation plate 72 and a gap 74 that extends from the thermal isolation plate 72 to the housing assembly 42. The pump assembly 20 includes bolts 75 that couple the thermal isolation plate 72 to the top of the housing assembly 42 so that the gap 74 is formed between the housing assembly 42 and the thermal isolation plate 72. The thermal isolation plate 72 can include a plurality of spacers 76 that are disposed around the bolts 75 and are positioned between a surface of the thermal isolation plate 72 and the upper plate 44a of the housing assembly 42. The spacers 76 may be monolithic with the thermal isolation plate 72, or may be separable from the thermal isolation plate 72 such that the gap 74 may be adjustable. The thermal isolation plate 72 functions to inhibit the transfer of heat from the pump 40 to the drive motor unit 60. To do this, the thermal isolation plate 72 and the spacers 76 are made of a material that has a lower thermal conductivity than the adhesives that form the components of the housing assembly 42 and an outer casing 61 of the drive motor unit 60. Furthermore, the spacers 76 separate the thermal isolation plate 72 and the housing assembly 42 such that the thermal isolation plate 72 and the housing assembly 42 has the gap 74, which minimizes direct contact between the housing assembly 42 and the drive motor unit 60.

Referring to FIG. 3, each of the pump assemblies 20a-20g is removably attached to the manifold 12. In one embodiment, each pump assembly 20 is secured to a plate 28 via a fastener 27. The plate 28 is attached at one end to the first end plate 24 via a fastener 29, and at the opposite end to the second end plate 26 via another fastener 29. Fasteners 27 may be threaded, such that removing a pump assembly 20 from the manifold 12 requires unscrewing the fastener 27 from the pump assembly 20 and removing the pump assembly 20 from the manifold 12. However, other methods of releasably attaching the pump assemblies 20 to the manifold 12 are contemplated, such as a slot and groove system, snap fit engagement, etc. Because the pump assemblies 20 may be releasably coupled to the manifold 12 in the above manner, a particular pump assembly 20 may be individually replaced without completely disassembling the entire applicator 10. Pump assemblies 20 may require replacement for a variety of reasons, including cleaning, damage, or changed adhesive pumping conditions or requirements.

Figure 11:
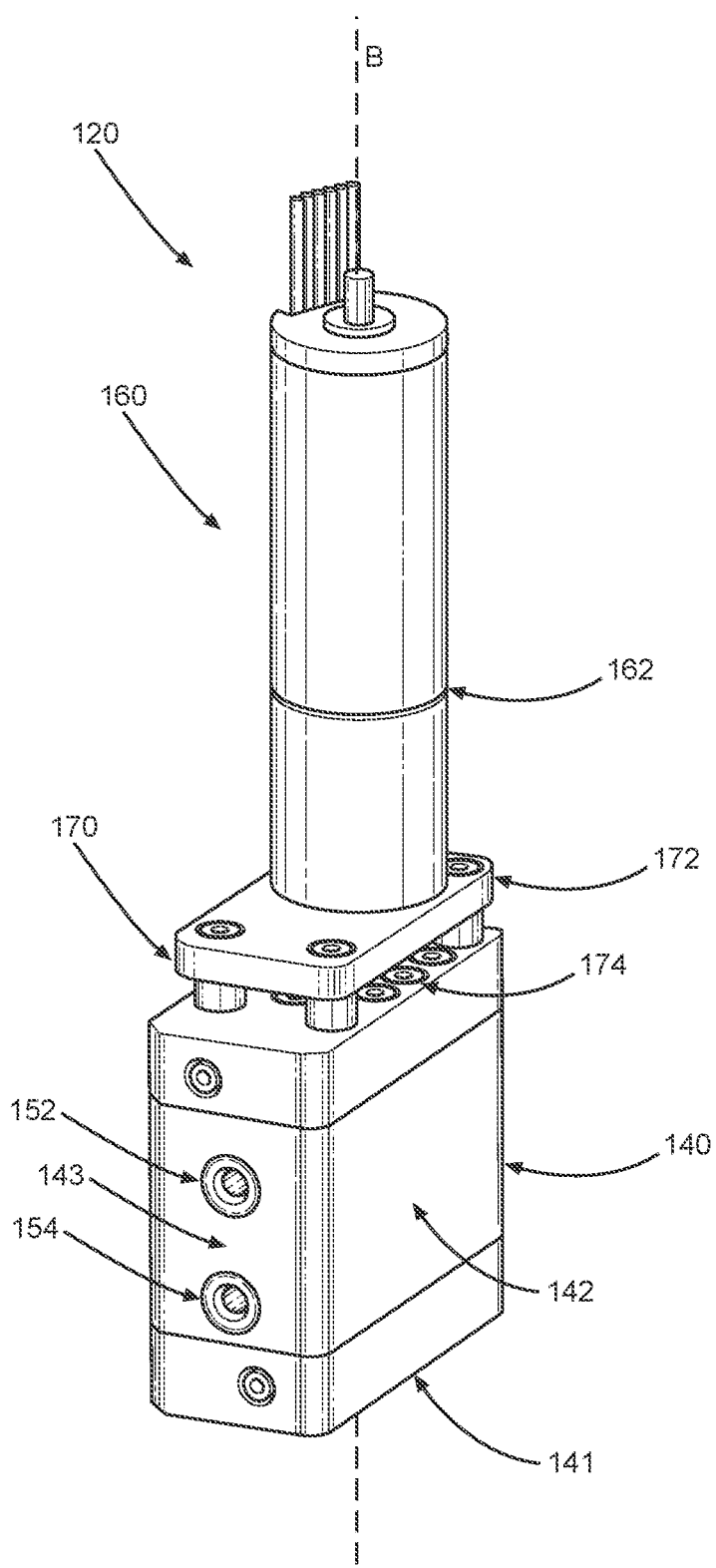
FIG. 11 is a perspective view of an alternative pump assembly that can be used in the applicator shown in FIG. 1.
Figure 12:
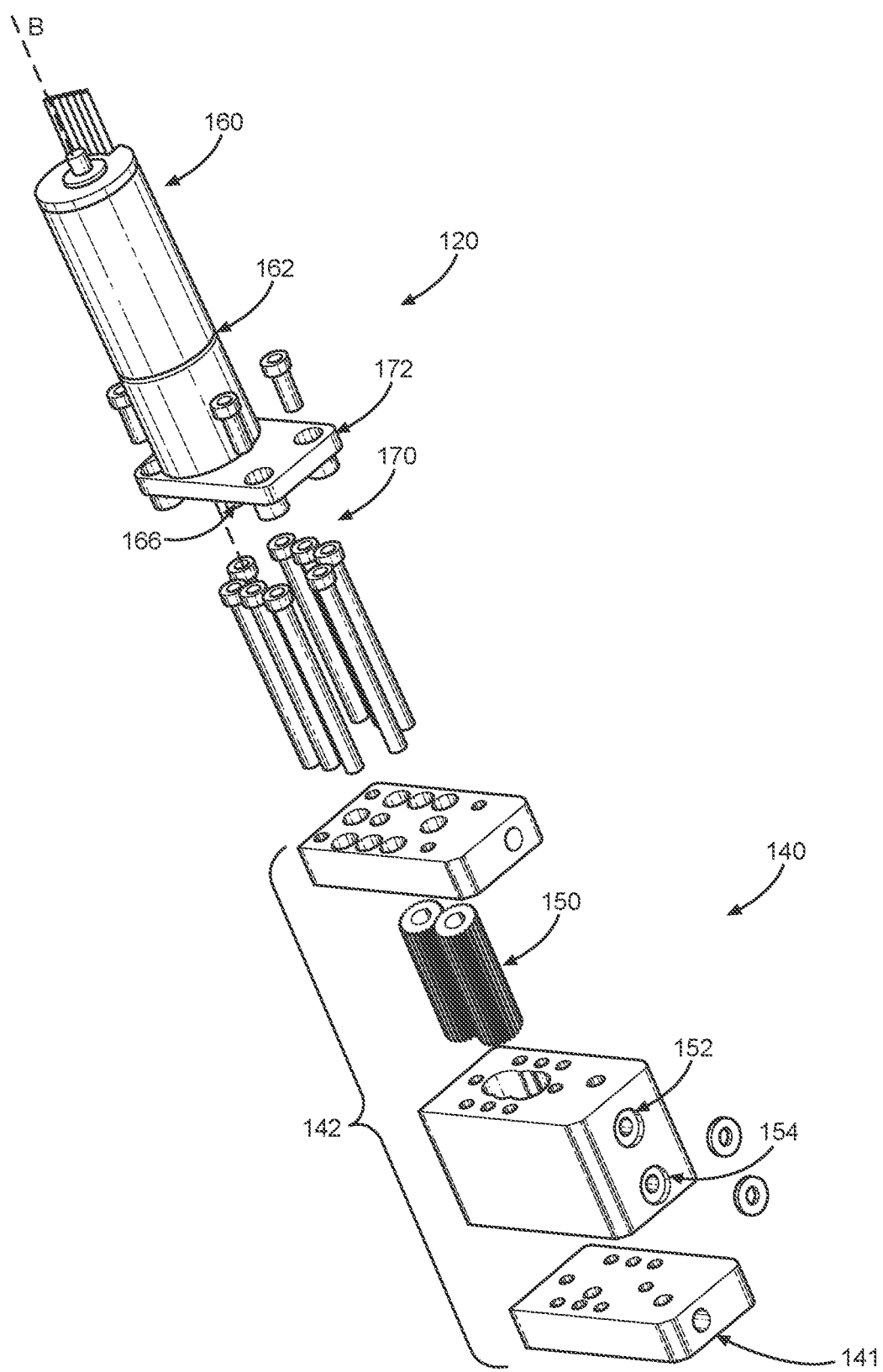
FIG. 12 is an exploded view of the pump assembly shown in FIG. 11.
Figure 13:
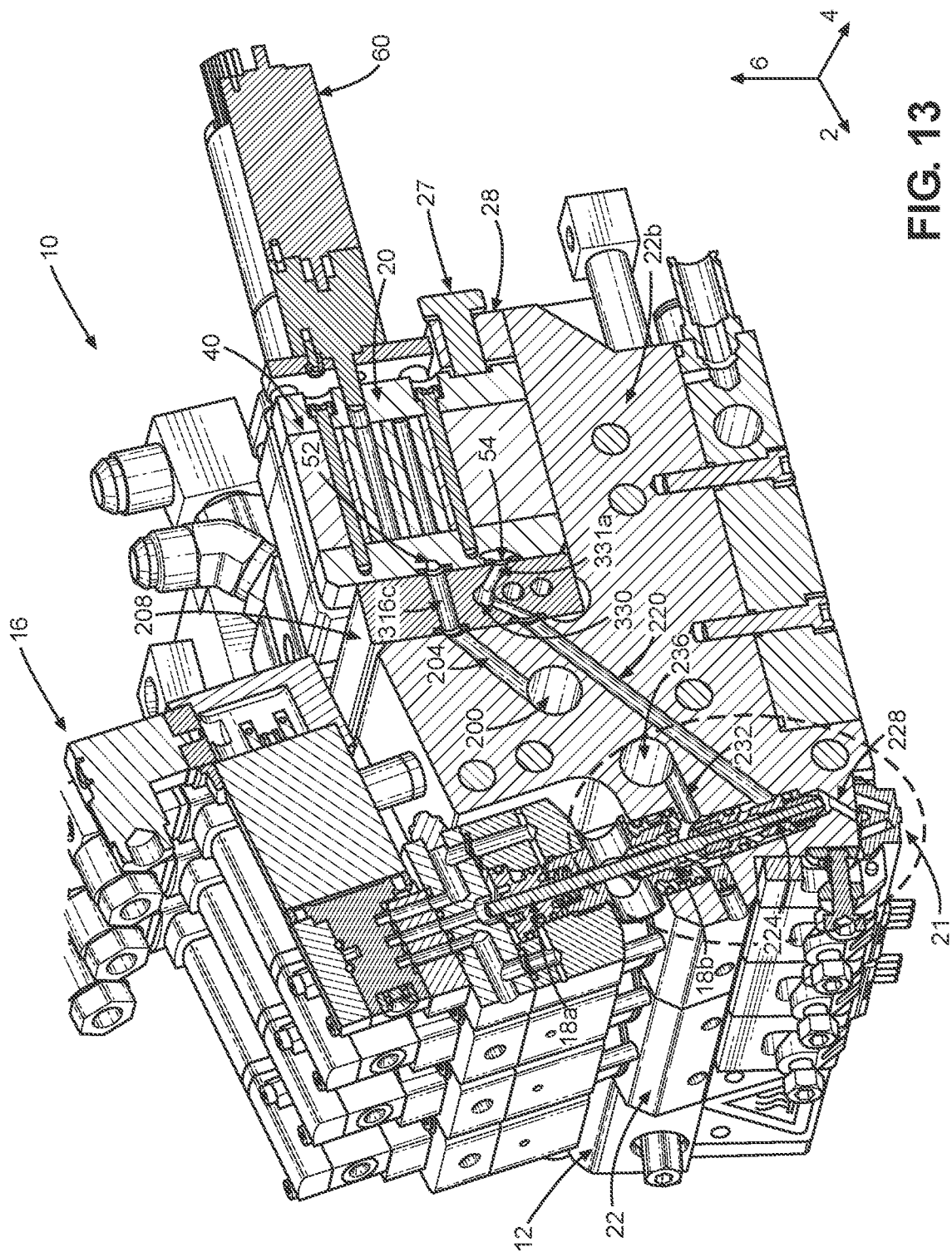
FIG. 13 is a perspective view of the applicator shown in FIG. 1, in horizontal cross-section.

FIGS. 11-12 illustrate another embodiment of the present invention. FIG. 13 shows a pump assembly 120 that is similar in most aspects to the pump assembly 20 shown in FIGS. 1-9 and described above. However, the pump assembly 120 has an inlet 152 and an outlet 154 that are oriented differently than the inlet 52 and outlet 54 of the pump assembly 20. The pump assembly 120 is configured to supply heated liquid to the manifold 12 at a given volumetric flow rate. Each pump assembly 120 includes a pump 140 and a dedicated drive motor unit 160 that powers the pump 140. The pump assembly 120 also includes a thermal isolation region 170 between the pump 140 and the drive motor unit 160. The thermal isolation region 170 is defined by a thermal isolation plate 172 and a gap 174 that extends from the thermal isolation plate 172 to the housing assembly 142. The thermal isolation region 170 minimizes thermal transfer of heat generated by the pump 140 to the drive motor unit 160, thereby minimizing the effect of temperature on the electronic components in the drive motor unit 160. The dedicated drive motor unit 160 and thermal isolation region 170 are the same as the drive motor unit 60 and the thermal isolation region 70 described above and illustrated in FIGS. 6-9.

Continuing with FIGS. 11-12, the drive motor unit 160 includes a motor 162, an output drive shaft 266, and connectors (not shown) that are coupled to a power source (not shown), as well as the control system 110. The drive shaft 166 has a drive axis B about which the drive shaft 166 rotates. When the pump assembly 120 is coupled to the manifold 12, the drive axis B may intersect and may be angularly offset with respect to the plane X that is perpendicular to the plane Y. In this configuration, the drive motor axis B does not intersect either the first side surface 34a or the second side surface 34b of the manifold 12. Additionally, the drive motor axis B does not intersect the bottom surface 30 of the manifold 12. Rather, the pump assembly 120 is positioned on the manifold 12 so that drive motor axis B of the drive motor unit 160 lies in a plane Y that is parallel to the first plane P1 and/or the second plane P2 of the first side surface 34a and the second side surface 34b, respectively.

The pump 140 defines a bottom surface 141 and a side surface 143, and includes a housing assembly 142 and one or more gear assemblies 150 contained within the housing assembly 142, an inlet 152 for receiving liquid from the manifold 12, and an outlet 154 for discharging liquid back into the manifold 12. In accordance with the illustrated embodiment, the inlet 152 and the outlet 154 of the pump 140 are disposed on the side surface 143 of the pump 140, such that the inlet 152 and outlet 154 are oriented in a direction that is perpendicular to the drive motor axis B of the drive motor unit 160.

Continuing with FIGS. 13-14, the flow path of adhesive through the applicator 10 will be described. The flow of adhesive through any particular element is represented by solid arrows that appear in the associated figures. The applicator 10 may be attached to an adhesive supply (not shown) by a hose (not shown), which attaches to the input connector 14 (FIG. 5). The adhesive supply can be any device capable of supplying adhesive to applicator 10. For example, the adhesive supply may be a melter configured to supply hot-melt adhesive to the applicator 10. The adhesive flows from the adhesive supply, through the hose, through the input connector 14, and into the supply channel 200 defined by the manifold 12 of the applicator 10. The supply channel 200 may extend from the first side surface 34a, through each of the manifold segments 22a-c, and to the second side surface 34b. However, the supply channel 200 may not necessarily extend entirely from the first side surface 34a to the second side surface 34b, but may terminate at an interior location between the first and second side surfaces 34a and 34b. Additionally, the supply channel 200 may extend between other combinations of surfaces of the manifold 12 as desired.

The manifold 12 includes a pressure release valve 17 that regulates flow in a pressure release channel (not shown) that is in fluid communication with the supply channel 200. The pressure release valve 17 is depicted as being positioned at the front surface 36 of the manifold 12. However, the pressure release valve can be positioned on any surface of the manifold 12 as desired. The pressure release valve 17 is capable of being alternated between an open and closed position. When an operator desires to relieve adhesive pressure within the supply channel 200, the pressure release valve 17 is switched from the closed to open positions. In the open position, adhesive flows from the supply channel 200, through the pressure release channel, and out of the applicator 10 through a drain (not shown). Pressure relief may be desired when the operator is about to commence a service or maintenance operation of the applicator 10.

As the supply channel 200 extends through the manifold 12, it supplies adhesive to each of the pump assemblies 20a-20f, with the exception of the designated recirculation pump assembly 20g. For simplicity, a cross-section of the applicator 10 shown in FIGS. 13-14 only shows the supply of adhesive to one pump assembly 20 and one dispensing module 16. However, the supply channel 200 may supply each additional pump assembly 20 and dispensing module 16 similarly. The manifold segment 22 defines a first segment input channel 204, which extends from the supply channel 200 to a diverter plate 208, which may be positioned on the applicator 10 between the pump assembly 20d and the manifold segment 22b. The diverter plate 208 may be removably coupled to the applicator 10, and may define a variety of passages for carrying adhesive from the manifold 12, to the pump assemblies 20, and back. For example, as shown in FIG. 13, the diverter plate 208 defines a pump channel 316c that extends from the first segment input channel 204 to the inlet 52 of the pump assembly 20. The diverter plate 208 may also define a third diverter channel 330, an input channel 331a that extends from the outlet 54 of the pump assembly 20 to the third diverter channel 330, and an output channel 332a that extends from the third diverter channel 330 to a second segment input channel 220. However, the diverter plate 208 may include different channel configurations than those shown. The diverter plate 208 shown in FIG. 13 may function as one of many interchangeable diverter plates that may be used to variably route the adhesive through the applicator 10 as different dispensing operations require.

Figure 14:
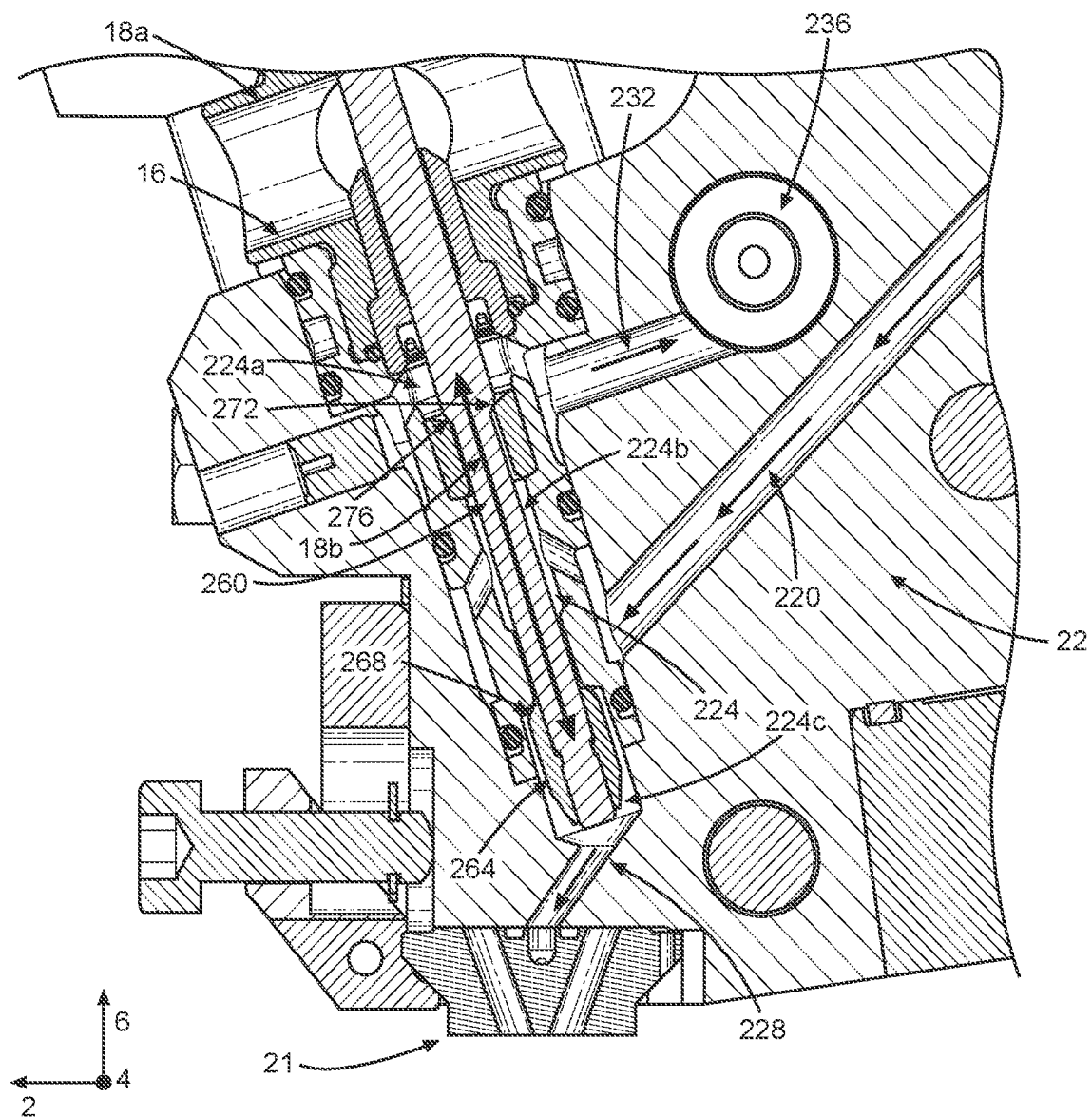
FIG. 14 is an enhanced view of the encircled region shown in FIG. 13.

In the embodiment shown in FIGS. 13-14, the adhesive flows from the supply channel 200, through the first segment input channel 204, through the pump channel 316c of the diverter plate 208, and to the inlet 52 of the pump assembly 20. The pump assembly 20 then pumps the adhesive out of the outlet 54 at a predetermined volumetric flow rate, which may be different than the volumetric flow rate of the adhesive upon entering the inlet 52 of the pump assembly 20. From there, the adhesive flows again through the diverter plate 208, through the second segment input channel 220, and to a dispensing flow path 224. The dispensing flow path 224 is defined by the lower portion 18b of the dispensing module 16, which is received by the manifold segment 22. The dispensing flow path 224 defines an upper section 224a, a lower section 224c opposite the upper section 224a, and a central section 224b disposed between the upper and lower sections 224a and 224c. The lower section 224c of the dispensing flow path 224 is in fluid communication with a nozzle channel 228, which extends away from the dispensing flow path 224. The upper section 224a of the dispensing flow path 224 is in fluid communication with a recirculation feed channel 232, which extends from the upper section 224a of the dispensing flow path 224 to a recirculation channel 236. The recirculation channel 236 will be discussed further below.

The lower portion 18b of the dispensing module 16 is the portion of the applicator 10 that directly interacts with the adhesive to control the flow of the adhesive out of the applicator 10. The applicator 10 may include a valve stem 260 that extends from an upper portion 18a of the dispensing module 16 that is opposite the lower portion 18b of the dispensing module 16, to the lower portion 18b of the dispensing module 16. The valve stem 260 may define a lower valve element 264 and an upper valve element 272 that is spaced from the lower valve element 264 along the valve stem 260. The lower portion 18b of the dispensing module 16 may define a lower valve seat 268 that is configured to interact with the lower valve element 264 of the valve stem 260, and an upper valve seat 276 that is spaced from the lower valve seat 268, where the upper valve seat 276 is configured to interact with the upper valve element 272 of the valve stem 260.

In operation, the valve stem 260 may alternate between a first position and a second position. When the valve stem 260 is in the first position, the dispensing module 16 is in an open configuration. When the valve stem 260 is in the second position, the dispensing module 16 is in a closed configuration. The upper and lower valve elements 272 and 264 may substantially face in opposite directions, such that each of the upper and lower valve elements 272 and 264 interact with the corresponding upper and lower valve seats 276 and 268 in different ones of the first position and second position. In FIGS. 13-14, the upper valve element 272 is shown as facing away from the upper portion 18a of the dispensing module 16, while lower valve element 264 is shown as facing toward the upper portion 18a of the dispensing module 16. However, in another embodiment this relationship may be reversed, such that the upper valve element 272 faces toward the upper portion 18a of the dispensing module 16, while the lower valve elements 264 faces away from the upper portion 18a of the dispensing module 16. In one embodiment, in the first position, the valve stem 260 is lowered within the dispensing flow path 224, such that the upper valve element 272 of the valve stem 260 engages the upper valve seat 276, and the lower valve element 264 is spaced from the lower valve seat 268. In this position, the engagement between the upper valve element 272 and the upper valve seat 276 blocks adhesive from flowing from the central section 224b of the dispensing flow path 224 to the upper section 224a. Rather, the lack of engagement between the lower valve element 264 and the lower valve seat 268 permits adhesive to flow from the central section 224b of the dispensing flow path 224 to the lower section 224c. As such, when the valve stem 260 is in the first position, adhesive flows from the second segment input channel 220, through the central and lower sections 224b and 224c of the dispensing flow path 224, and to the nozzle channel 228. From the nozzle channel 228, the adhesive then flows through the nozzle 21 and out of the applicator 10. Accordingly, the first position of this embodiment is the position in which the applicator 10 applies adhesive to a substrate during a manufacturing operation.

In the second position, the valve stem 260 is raised within the dispensing flow path 224, such that the upper valve element 272 of the valve stem 260 is spaced from the upper valve seat 276, and the lower valve element 264 engages the lower valve seat 268. In this position, the engagement between the lower valve element 264 and the lower valve seat 268 blocks adhesive from flowing from the central section 224b of the dispensing flow path 224 to the lower section 224c. Rather, the lack of engagement between the upper valve element 272 and the upper valve seat 276 permits adhesive to flow from the central section 224b of the dispensing flow path 224 to the upper section 224a. As such, in the second position, adhesive flows from the second segment input channel 220, through the central and upper sections 224b and 224a of the dispensing flow path 224, and to the recirculation feed channel 232. From the recirculation feed channel 232, the adhesive flows into the recirculation channel 236. Though one dispensing module 16 and manifold segment 22 is shown in cross section in FIGS. 13-14, each additional dispensing module 16 and manifold segments 22 may be similarly configured. Further, the valve stem 260 of each dispensing module 16 may be configured to be actuated between the first and second positions independent of any of the other valve stems 260, such that at any time the valve stems 260 of the dispensing modules 16 may be in any combination of the first and second positions. Alternatively, any combination of the valve stems 260 may be configured to transition between the first and second positions in unison.

Figure 15:
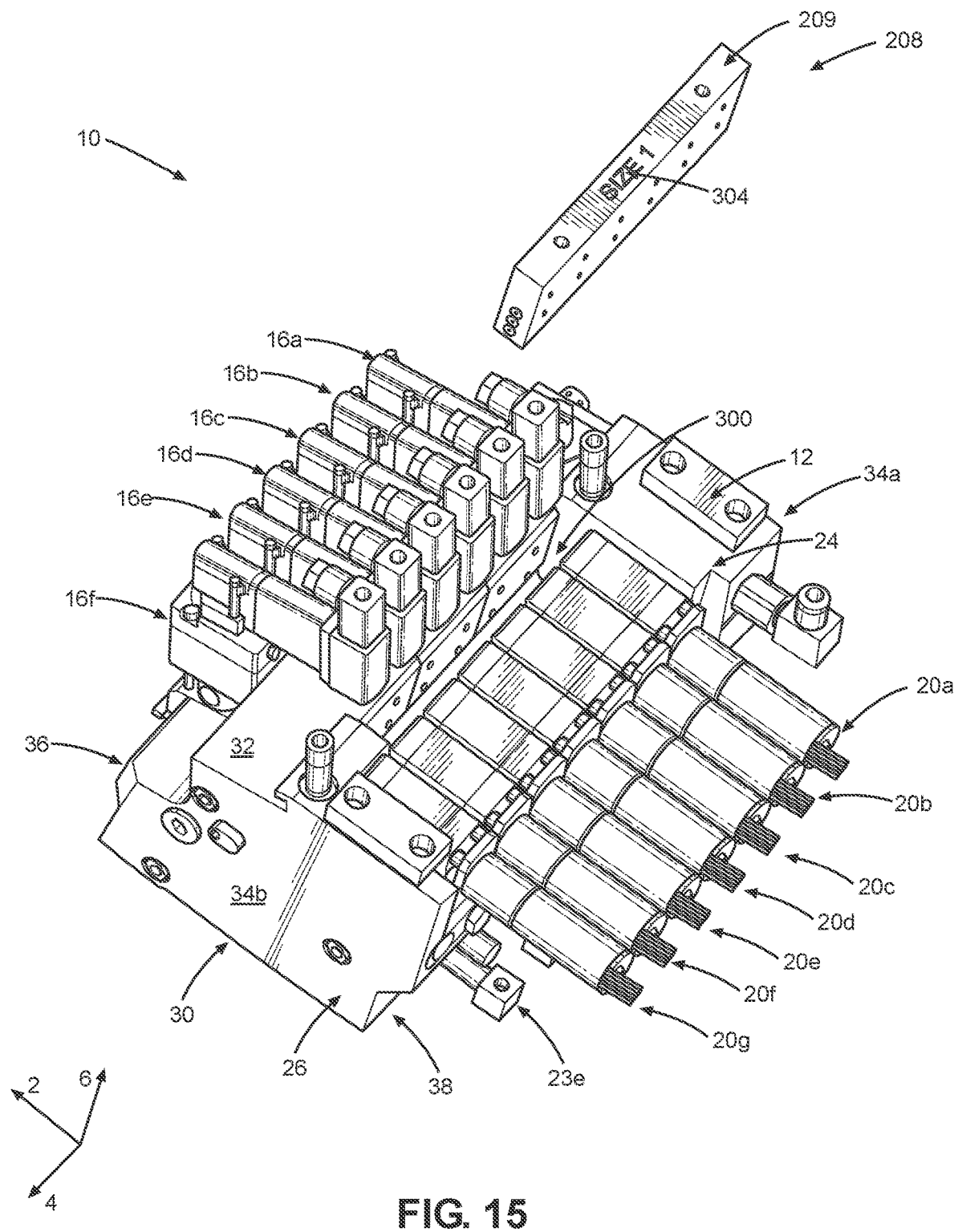
FIG. 15 is a top perspective view of the applicator shown in FIG. 1, with the diverter plate removed from the applicator.

Turning to FIGS. 15-17C, the diverter plate 208 will be described in further detail. The diverter plate 208 includes a body 209, and may be configured to be removably attached to the applicator 10. In one embodiment, the applicator 10 defines a recess 300 that is sized to receive the diverter plate 208. As shown in FIG. 15, the recess 300 may be defined by portions of the first end plate 24, the second end plate, 26, and the manifold segments 22a-22c. Further, the recess 300 may be partially defined by the bottom surfaces 41 of pump assemblies 20, or alternatively by the side surfaces 143 of pump assemblies 120. As a result, the particular size of the recess 300 can be altered to accommodate different diverter plates 208 and dispensing operations. For example, the recess 300 is depicted as extending in the lateral direction 4 from the first end plate 24 to the second end plate 26. However, an operator of the applicator 10 may interchange the manifold segments 22 shown with alternative manifold segments 22 that change the shape of the recess 300. As such, in another embodiment, the recess 300 may not extend entirely from the first end plate 24 to the second end plate 26. Alternatively, the diverter plate 208 may be integral with the applicator 10, such that the diverter plate is not removable from the applicator 10.

The body 209 of the diverter plate 208 defines a top surface 210a, a bottom surface 210b opposite the top surface 210a, a first side surface 210c, a second side surface 210d opposite the first side surface 210c, a front surface 210e, and a back surface 210f opposite the front surface 210e. The first and second side surface 210c and 210d may extend from the top surface 210a to the bottom surface 210b, and from the front surface 210e to the back surface 210f.

The diverter plate 208 defines a plurality of pump channels 316 that extend from the front surface 210e to the back surface 210f. In the depicted embodiment, the diverter plate 208 includes six pump channels 316a, 316b, 316c, 316d, 316e, and 316f. However, the diverter plate 208 may define more or less pump channels 316 as desired. For example the diverter plate 208 can include one, two, three, or more pump channels 316, depending on the particular dispensing operation that is being performed. Each of the pump channels 316a-316f extends from a diverter plate input opening 313 to a diverter plate output opening 314. As such, the diverter plate 208 is depicted as including six diverter plate input opening 313a-316f and six diverter plate output openings 314a-314f. In particular, the pump channel 316a extends from the diverter plate input opening 313a to the diverter plate output opening 314a, the pump channel 316b extends from the diverter plate input opening 313b to the diverter plate output opening 314b, the pump channel 316c extends from the diverter plate input opening 313c to the diverter plate output opening 314c, the pump channel 316d extends from the diverter plate input opening 313d to the diverter plate output opening 314d, the pump channel 316e extends from the diverter plate input opening 313e to the diverter plate output opening 314e, and the pump channel 316f extends from the diverter plate input opening 313f to the diverter plate output opening 314f. The pump channels 316a-316f are configured to provide a path for adhesive to flow from the supply channel 200 and the first segment input channel 204 to the inlets 52 of the pump assemblies 20a-20f. Though the pump channels 316a-316f are depicted as extending substantially along the longitudinal direction 2, the pump channels may extend along any combination of the longitudinal, lateral, and vertical directions 2, 4, and 6 as desired.

The body 209 of the diverter plate 208 may also define a plurality of diverter channels that are configured to route adhesive flow from the outlets 54 of pump assemblies 20*a*-20*f* to the dispensing modules 16*a*-16*f.* In the depicted embodiment, the diverter plate defines three diverter channels: a first diverter channel 322, a second diverter channel 326, and a third diverter channel 330. The first, second, and third diverter channels 322, 326, and 330 are shown as extending substantially along the lateral direction 4 between the first side surface 210*c* and the second side surface 210*d*. However, the first, second, and third diverter channels 322, 326, and 330 may extend along any combination of the longitudinal, lateral, and vertical directions 2, 4, and 6 as desired. Additionally, the first, second, and third diverter channels 322, 326, and 330 are shown as being substantially equal in length, as each extends substantially from the first side surface 210*c* to the second side surface 210*d*. In other embodiments, the first, second, and third diverter channels can each define different lengths, and can terminate at respective positions between the first and second side surface 210*c* and 210*d*. Also, although three diverter channels are shown, the diverter plate 208 may include any number of diverter channels, such as one, two, three, or more diverter channels. The first, second, and third diverter channels 322, 326, and 330 are configured to each divert the flow of adhesive through the diverter plate 208 from a particular combination of the pump assemblies 20*a*-20*f* to a corresponding one or more of the dispensing modules 16*a*-16*f.*

Each of the first, second, and third diverter channels 322, 326, and 330 is in fluid communication with at least one input channel and at least one output channel. For example, as shown in FIGS. 16B-16C, each of the diverter channels is in fluid communication with two input channels and two output channels. An input channel and an output channel of the first, second, or third diverter channels 322, 326, and 330 can collectively be referred to collectively as a diverter passage, such that a single diverter passage can include one input channel and output channel. However, a single diverter passage can alternatively include a plurality of input channels and/or a plurality of output channels. The input channels provide adhesive to the first, second, and third diverter channels 322, 326, and 330, while the output channels direct adhesive from the first, second, and third diverter channels 322, 326, and 330 back to the manifold 12. The first diverter channel 322 connects to input channels 323*a* and 323*b* and output channels 324*a* and 324*b*, the second diverter channel 326 connects to input channels 327*a* and 327*b* and output channels 328*a* and 328*b*, and the third diverter channel 330 connects to input channels 331*a* and 331*b* and output channels 332*a* and 332*b*. However, each diverter channel may be in fluid communication with less or more input and output channels as dictated by the particular dispensing operation. In other embodiments, the diverter channels may be in fluid communication with one, three, four, or more input and output channels. As shown, the first, second, and third diverter channels 322, 326, and 330 are vertically aligned along the longitudinal direction 2, such that the third diverter channel 330 is positioned vertically above the first and second diverter channels 322 and 326, and the first diverter channel 322 is positioned vertically below the second and third diverter channels 326 and 330. Despite this, in other embodiments the first, second, and third diverter channels 322, 326, and 330 may be positioned otherwise, such that the first, second, and third diverter channels 322, 326, and 330 are aligned along any combination of the longitudinal, lateral, and vertical directions 2, 4, and 6, or are not aligned along any direction.

Each of the input channels 323*a*, 323*b*, 327*a*, 327*b*, 331*a*, and 331*b* may extend from the back surface 210*f* to a respective one of the first, second, and third diverter channels 322, 326, and 330, while each of the output channels 324*a*, 324*b*, 328*a*, 328*b*, 332*a*, and 332*b* may extend from the front surface 210*f* to a respective one of the first, second, and third diverter channels 322, 326, and 330. In particular, each of the input channels 323*a*, 323*b*, 327*a*, 327*b*, 331*a*, and 331*b* may extend from a respective one of the pump output openings 318*a*-318*f* located on the back surface 210*f* of the diverter plate 208 to a respective one of the first, second, and third diverter channels 322, 326, and 330, and each of the output channels 324*a*, 324*b*, 328*a*, 328*b*, 332*a*, and 332*b* may extend from a respective one of the first, second, and third diverter channels 322, 326, and 330 to a respective one of the applicator input openings 319*a*-319*f* on the front surface 210*e*. Though some of the input and output channels may extend substantially in the longitudinal direction 2, certain ones of the input and output channels depicted also extend in directions with directional components along the vertical direction 6. This is because, in some embodiments, the first, second, and third diverter channels 322, 326, and 330 may be aligned along the vertical direction 6. Configuring the input and output channels with different directional components allows these channels to connect to the respective first, second, and third diverter channels 322, 326, and 330, while allowing the pump output openings 318*a*-318*f* and the applicator input opening 319*a*-319*f* to be vertically aligned along the lateral direction 4. By keeping the pump output openings 318*a*-318*f* vertically aligned, any of the pump assemblies 20 can be interchangeably placed along the diverter plate 208, and the outlets 54 of the pump assemblies 20 will align with the pump output openings 318*a*-318*f* without any additional modifications.

Figure 17A:
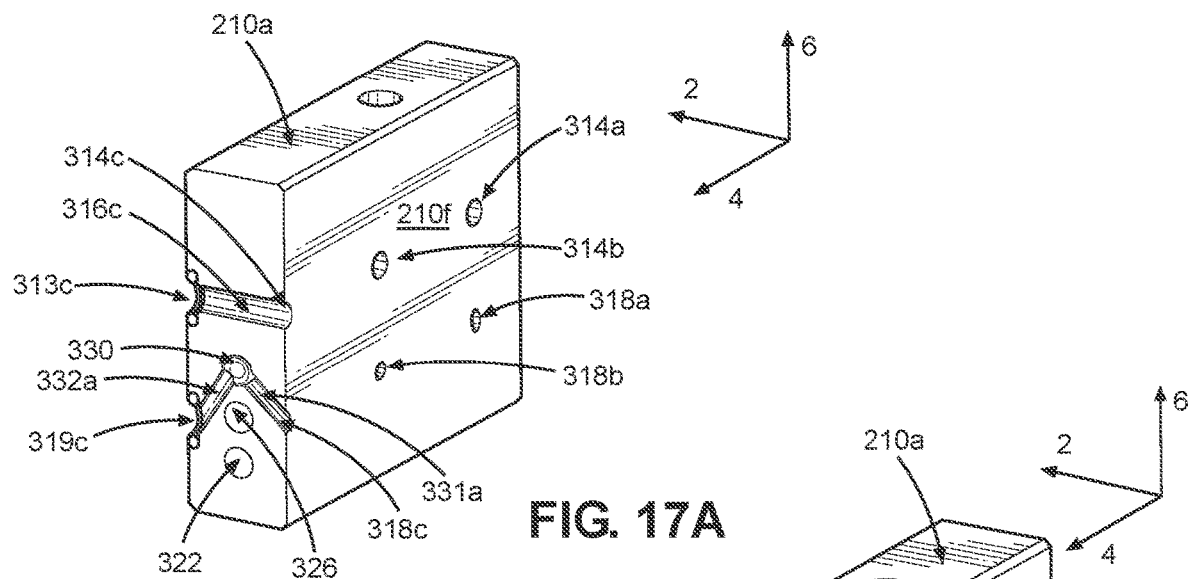
FIG. 17A is a cross-sectional view of the diverter plate taken along line 17A-17A in FIG. 16A.

As shown in FIG. 17A, in one embodiment, the input channel 331*a* extends from the pump output opening 318*c* to the third diverter channel 330 along a direction that includes components in the longitudinal and vertical directions 2 and 6, as the third diverter channel 330 is positioned above the pump output opening 318*c* along the vertical direction 6. Likewise, the output channel 332*a* extends from the third diverter channel 330 to the applicator input opening 319*c* along a direction that also includes components in the longitudinal and vertical directions 2 and 6, as the applicator input opening 319*c* is positioned below the third diverter channel 330 along the vertical direction 6. The vertical component of the direction that the output channel 332*a* extends in may have an opposite orientation to the vertical component of the direction that the input channel 331*a* extends in. The pump output opening 318*c* and the applicator input opening 319*c* may be offset along the vertical direction 6. Alternatively, the pump output opening 318*c* and the applicator input opening 319*c* may be substantially aligned along the vertical direction 6. Additionally, the input channel 331*a* and the output channel 332*a* extend from the back and front surfaces 210*f* and 210*e*, respectively, to the third diverter channel 330 without intersecting either of the first or second diverter channels 222 and 226. The input channel 331*b* and the output channel 332*b*, which also connect to the third diverter channel 330, may be configured similarly to the input channel 331*a* and the output channel 332*a*. However, the input channel 331*b* and the output channel 332*b* may optionally be configured differently.

Figure 17B:
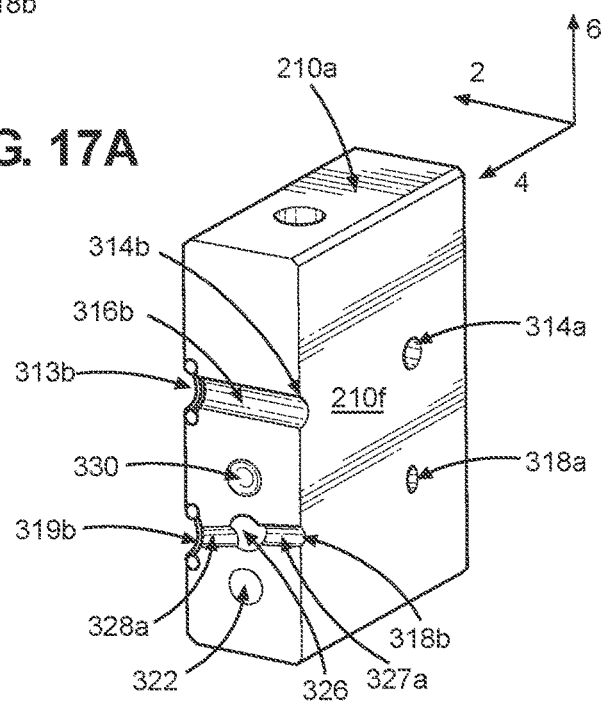
FIG. 17B is a cross-sectional view of the diverter plate taken along line 17B-17B in FIG. 16A.

As shown in FIG. 17B, in one embodiment, the input channel 327a extends from the pump output opening 318b to the second diverter channel 326 along a direction that includes components in both the longitudinal and vertical directions 2 and 6, as the second diverter channel 226 is positioned slightly below the pump output opening 318b along the vertical direction 6. Additionally, the output channel 328a extends from the second diverter channel 326 to the applicator input opening 319b along a direction that also includes components in the longitudinal and vertical directions 2 and 6, as the applicator input opening 319b is positioned below both the second diverter channel 326 and the pump output opening 318b along the vertical direction 6. The vertical component of the direction that the output channel 328a extends in may have the same orientation as the vertical component of the direction that the input channel 327a extends in. As a result, the pump output opening 318b is vertically offset from the applicator input opening 319b. However, in other embodiments, the pump output opening 318b may be vertically aligned with the applicator input opening 319b. The input and output channels 327a and 328a extend from the back and front surfaces 210f and 210e of the diverter plate 208, respectively, to the second diverter channel 326 without intersecting either of the first or third diverter channels 322 and 330. The input channel 327b and the output channel 328b, which also connect to the second diverter channel 326, may be configured similarly to the input and output channels 327a and 328a, respectively. However, the input channel 327b and the output channel 328b may optionally be configured differently.

Figure 17C:
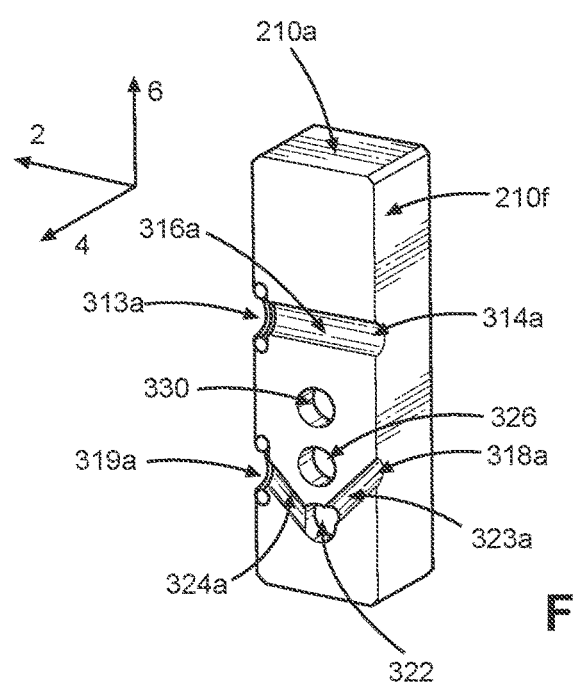
FIG. 17C is a cross-sectional view of the diverter plate taken along line 17C-17C in FIG. 16A.
Figure 18:
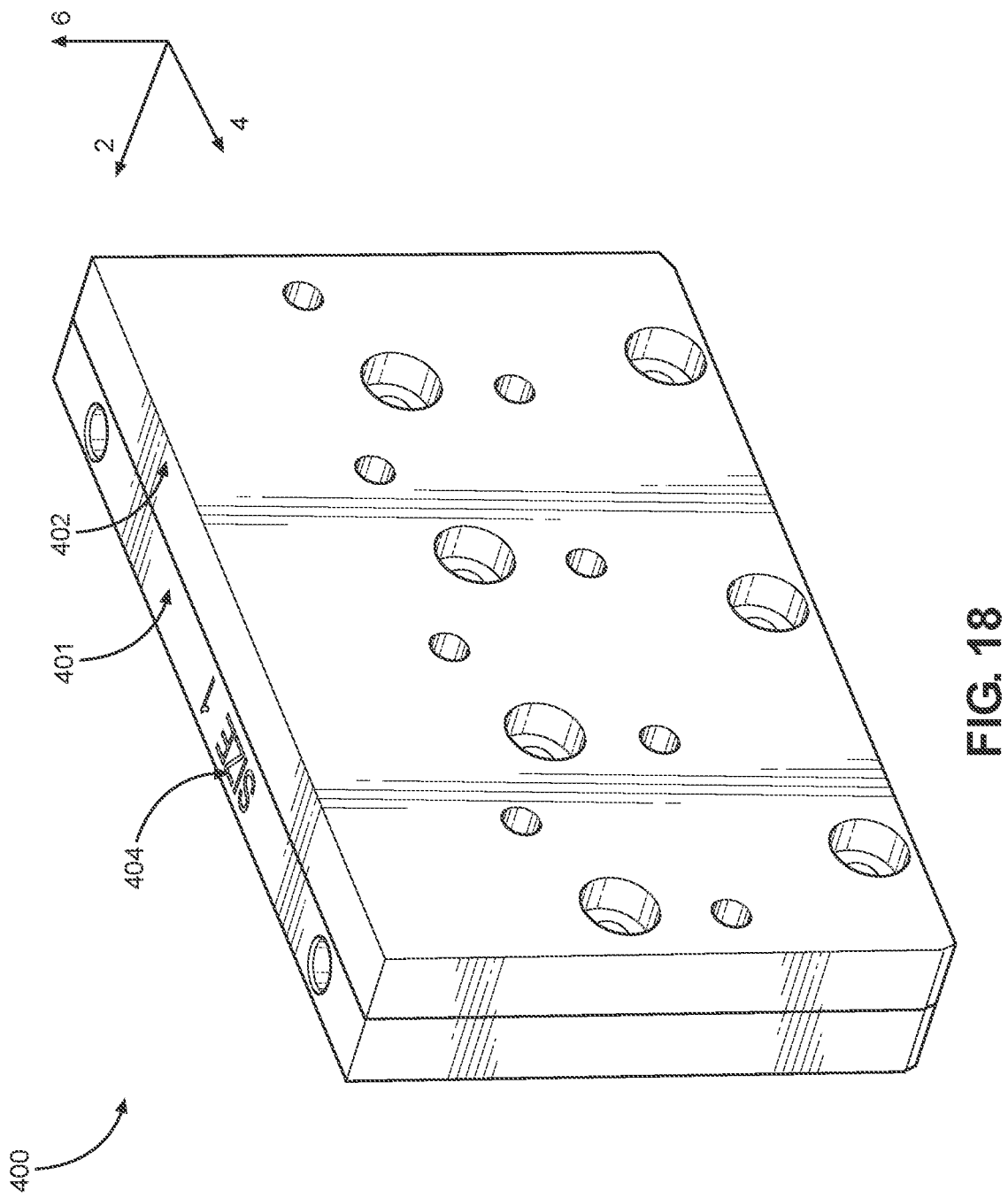
FIG. 18 is a perspective view of a diverter plate according to an embodiment of the present invention.
Figure 19A:
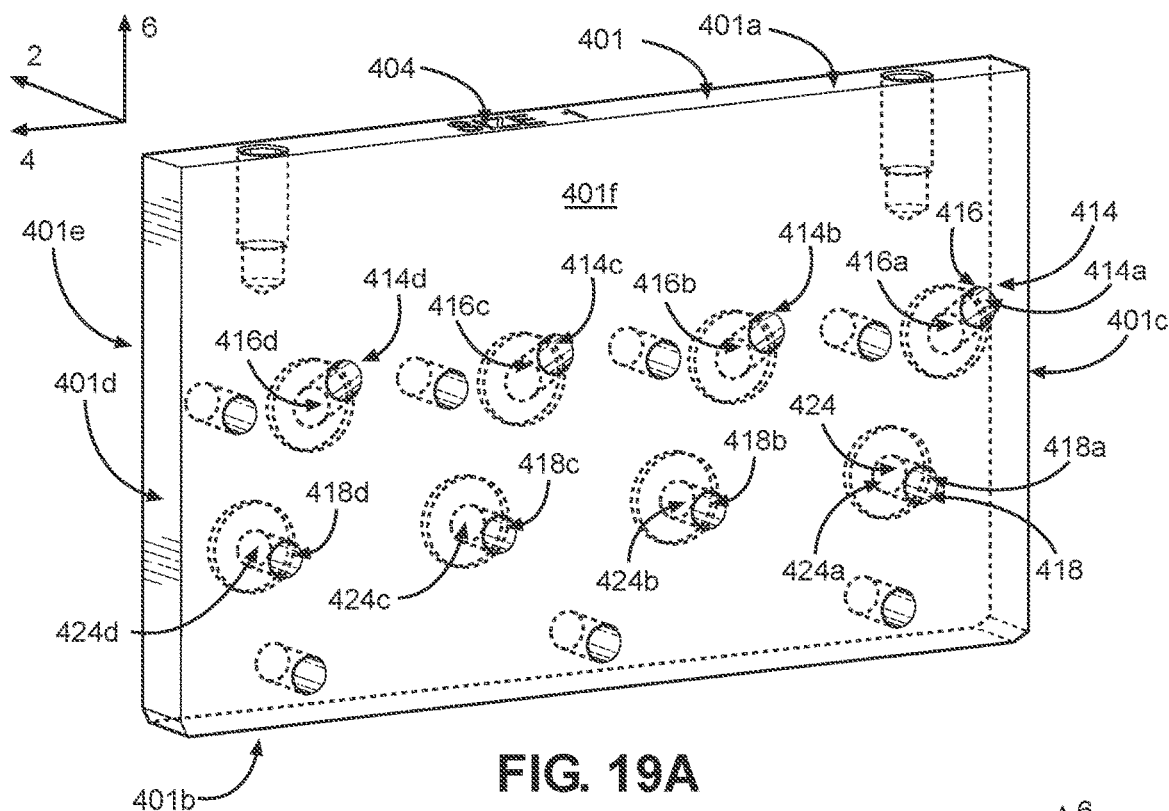
FIG. 19A is a rear perspective view of a first piece of the diverter plate shown in FIG. 18.
Figure 19B:
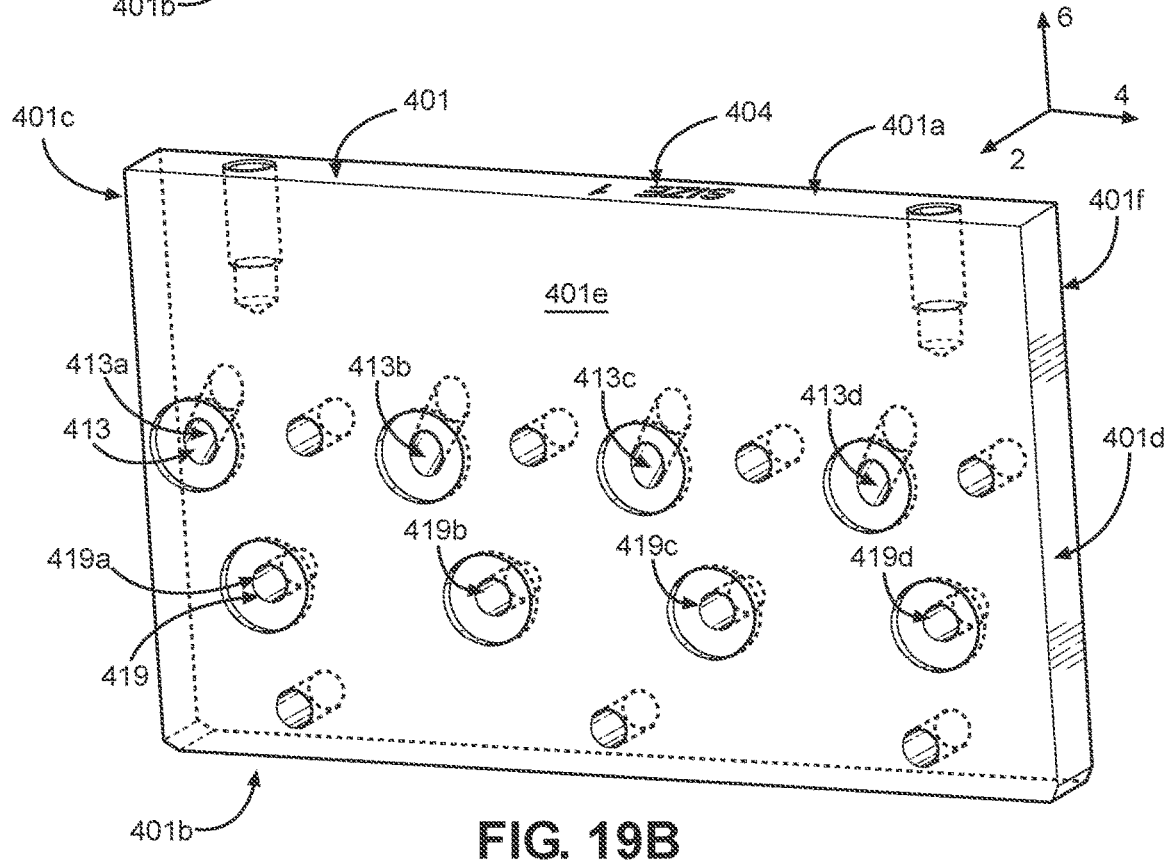
FIG. 19B is a front perspective view of the first piece of the diverter plate shown in FIG. 18.

As shown in FIG. 17C, in one embodiment, the input channel 323a extends from the pump output opening 318a to the first diverter channel 322 along a direction that includes components in both the longitudinal and vertical directions 2 and 6, as the first diverter channel 322 is positioned below the pump output opening 318a along the vertical direction 6. Additionally, the output channel 324a extends from the first diverter channel 322 to the applicator input opening 319a along a direction that also includes components in the longitudinal and vertical directions 2 and 6, as the applicator input opening 319a is positioned above the first diverter channel 322. The vertical component of the direction that the output channel 324a extends in may have the opposite orientation as the vertical component of the direction that the input channel 323a extends in. The pump output opening 318a may be vertically offset from the applicator input opening 319a. Alternatively, the pump output opening 318a may be vertically aligned with the applicator input opening 319a. The input and output channels 323a and 324a extend from the back and front surfaces 310f and 310 of the diverter plate 208, respectively, to the first diverter channel 322 without intersecting either of the second or third diverter channels 326 and 330. The input and output channels 323b and 324b, which also connect to the first diverter channel 322, may be configured similarly to the input and output channels 323a and 324a, respectively. However, the input channel 323b and the output channel 324b may be optionally configured differently.

Figure 16A:
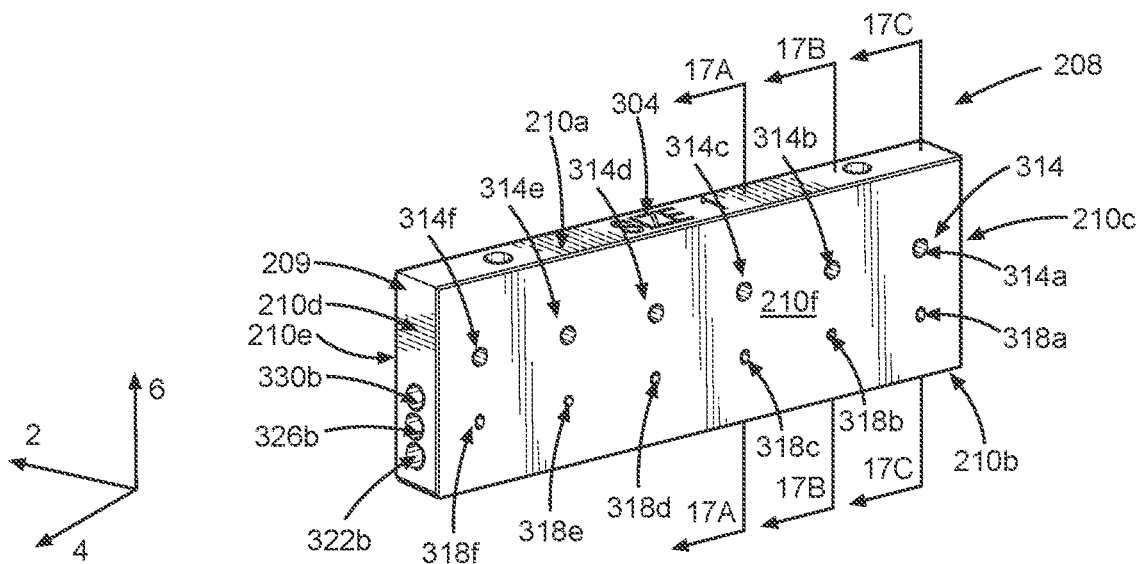
FIG. 16A is a rear perspective view of a diverter plate according to an embodiment of the present invention.
Figure 16B:
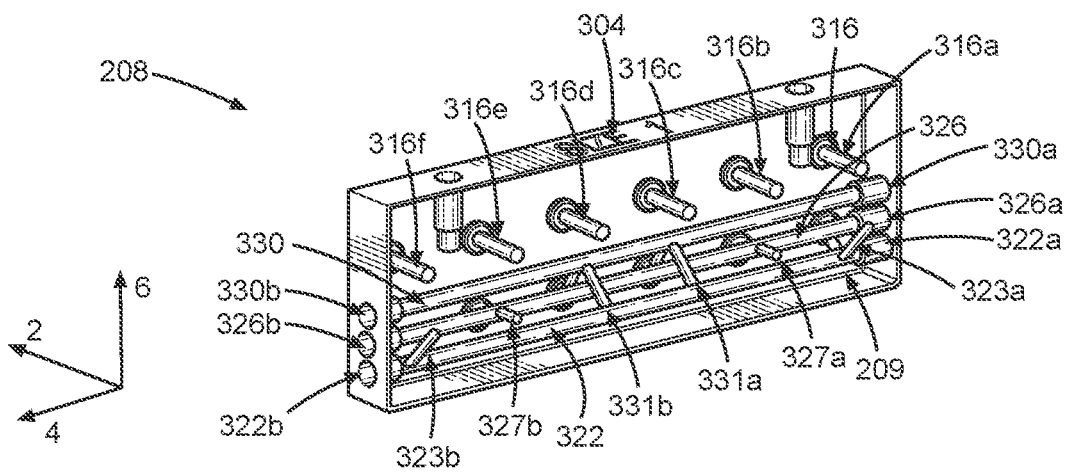
FIG. 16B is a rear perspective view of the diverter plate shown in FIG. 16A, with the back surface removed.
Figure 16C:
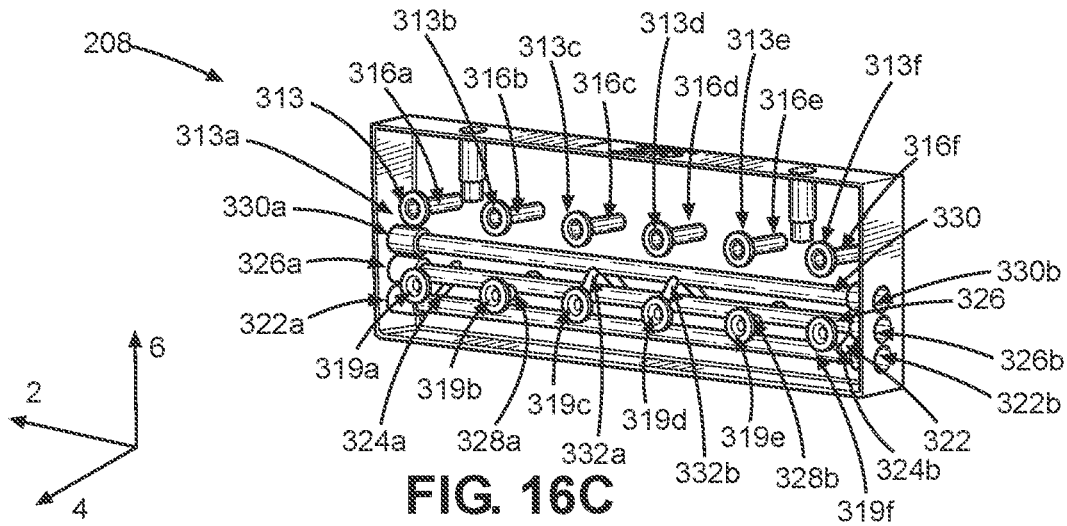
FIG. 16C is a front perspective view of the diverter plate shown in FIG. 16A, with the front surface removed.

Continuing with FIGS. 16A-16C, the first, second, and third diverter channels 322, 326, and 330 each define a first end and a second end. For example, the first diverter channel 322 defines a first end 322a and a second end 322b, the second diverter channel 326 defines a first end 326a and a second end 326b, and the third diverter channel 330 defines a first end 330a and a second end 330b. The first ends 322a, 326a, and 330a and the second ends 322b, 326b, and 330b may be configured to be open, such that adhesive may flow through the first ends 322a, 326a, and 330a and/or the second ends 322b, 326b, and 330b to other portions of the applicator 10. In one embodiment, the adhesive may flow through the first ends 322a, 326a, and 330a and/or the second ends 322b, 326b, and 330b to the dedicated recirculation pump assembly 20g. Alternatively, the first ends 322a, 326a, and 330a and/or the second ends 322b, 326b, and 330b may be closed, such that the adhesive may only flow in the input channels and out the output channels of the first, second, and third diverter channels 322, 326, and 330.

Referring to FIG. 15, the diverter plate 208 may further include a marking 304 on the top surface 210a. The marking 304 may include any information that conveys to an operator of the applicator 10 identifying characteristics of the diverter plate 208, such as the type of dispensing operation the diverter plate 208 is intended to be used in. The marking 304 may also indicate the orientation of insertion of the diverter plate 208 within the recess 300. Though the marking 304 is on the top surface 210a of the diverter plate in the depicted embodiments, the marking 304 may be an any of the surfaces 210a-210f that allow an operator of the applicator 10 to view the marking 304 while the diverter plate 208 is disposed in the recess 300 of the applicator 10. The presence of the marking 304 ensures that an operator is constantly aware of what adhesive flow path currently exists within the applicator, and that the adhesive flow path matches the dispensing operation that is taking place.

The presence of the diverter plate 208 functions to route the flow of adhesive between the pump assemblies 20a-20g and the dispensing modules 16a-16f. The ability to insert a diverter plate 208 into the applicator 10 provides an operator of the applicator 10 with a virtually unlimited combination of options for routing the flow of adhesive. The diverter plate 208 preserves the functionality of typical applicators, in that the pump assemblies 20a-20g can supply the dispensing modules 16a-16f in a one-to-one relationship, or such that one pump assembly 20 supplies adhesive to more than one of the dispensing modules 16a-16f. The diverter plate 208 also provides the ability to easily combine adhesive flows from multiple pump assemblies 20, and subsequently route that combined adhesive flow to one or more of the dispensing modules 16a-16f. This can improve metering accuracy of the adhesive flow rates through the dispensing modules 16a-16f, thus improving overall quality of the adhesive application to a given substrate, as each individual diverter plate 208 can be machined to accommodate a specific adhesive dispensing operation.

The addition of the diverter plate 208 to the applicator 10 serves to increase operational efficiency of the applicator 10, as the diverter plate 208 can be quickly and easily removed from and inserted into the recess 300 of the applicator 10. When an operator of the dispensing module desires to change dispensing operations, such that a new flow pattern from the dispensing modules 16a-16f is required, the operator may deactivate the applicator 10, remove the current diverter plate from the recess 300, insert a new diverter plate 208, and recommence operation of the applicator 10. This whole process can be performed while keeping the remaining structure of the applicator 10 intact. The operator may also load a new control program to control the pump assemblies 20a-20g and/or dispensing modules 16a-16f. When choosing a new diverter plate 208, an operator of the applicator 10 may select from a quantity of diverter plates 208 on hand that correlate to specific dispensing operations, or the operator may machine a new diverter plate 208 as desired. The operator of the applicator 10 does not have to rearrange any of the dispensing modules 16 or pump assemblies 20 when changing or installing a new diverter plate 208, which significantly limits the time that the applicator 10 is out of commission between dispensing operations. Additionally, the operator of the applicator 10 does not need to add additional pump assemblies 20 or dispensing modules 16 to begin a new dispensing operation, which can aid in reducing the overall footprint of the applicator 10.

The markings 304 on the diverter plate 208 provide a visual indication to the operator of the applicator 10 which diverter plate 208 is currently being used, and likewise the particular way that adhesive is routed from the pump assemblies 20 to the dispensing modules 16. Without the diverter plate 208, an operator of the applicator 10 may not be provided with any external indication of the internal flow path of adhesive through the applicator 10. This could lead operating an adhesive dispensing operation with a flow of adhesive through the applicator 10 other than intended, which can lead to a damaged or unsuitable finished product.

As shown in FIG. 15-17C, the body 209 of the diverter plate 208 has a unitary, monolithic structure. However, referring to FIGS. 18-20B, another embodiment of a diverter plate 400 can include multiple, separable pieces. For example, the diverter plate 400 can comprise a first piece 401 and a second piece 402 that can be removably coupled to the first piece 401. The first and second pieces 401 and 402 can be removably coupled to each other through a variety of means, such as through fasteners (not shown). The first piece 401 can include a marking 404 that allows an operator to easily identify the diverter plate 400. However, this marking can also be included on the second piece 402.

The first piece 401 of the diverter plate 400 can have a top surface 401a, a bottom surface 401b opposite the top surface 401a, a first side surface 401c, a second side surface 401d opposite the first side surface 401c, a front surface 401e, and a back surface 401f opposite the front surface 401e. The first piece 401 defines a plurality of pump channels 416a-416d that extend from the front surface 401e of the first piece 401 to the back surface 401f. Though the first piece 401 is shown as defining four pump channels 416a-416d, more or less pump channels 416 can be defined as desired. Each of the pump channels 416a-416d extends from a respective input opening 413a-413d defined by the front surface 401e of the first piece 401 to a respective output opening 414a-414d defined by the rear surface 401f of the first piece 401. As a result, the first piece 401 is depicted as including four input openings 413 and four output openings 414. However, the first piece 401 can include more or less input openings 413 and/or output openings 414 as desired, such that any of the pump channels 416 can extend between multiple input openings 413 and/or multiple output openings 414.

The first piece 401 of the diverter plate 400 also defines a plurality of output channels 424a-424d that extend from the front surface 401e of the first piece 401 to the back surface 401f. Though the first piece 401 is shown as defining four output channels 424, more or less can be defined as desired. Each of the output channels 424a-424d extends from a respective input opening 418a-418d defined by the back surface 401f of the first piece 401 to a respective output opening 419a-419d defined by the front surface 401e of the first piece 401. As a result, the first piece 401 is depicted as including four input openings 418 and four output openings 419. However, the first piece 401 can include more or less input openings 418 and/or output openings 419 as desired, such that any of the output channels 424a-424d can extend between multiple input openings 418 and/or multiple output openings 419.

Figure 20A:
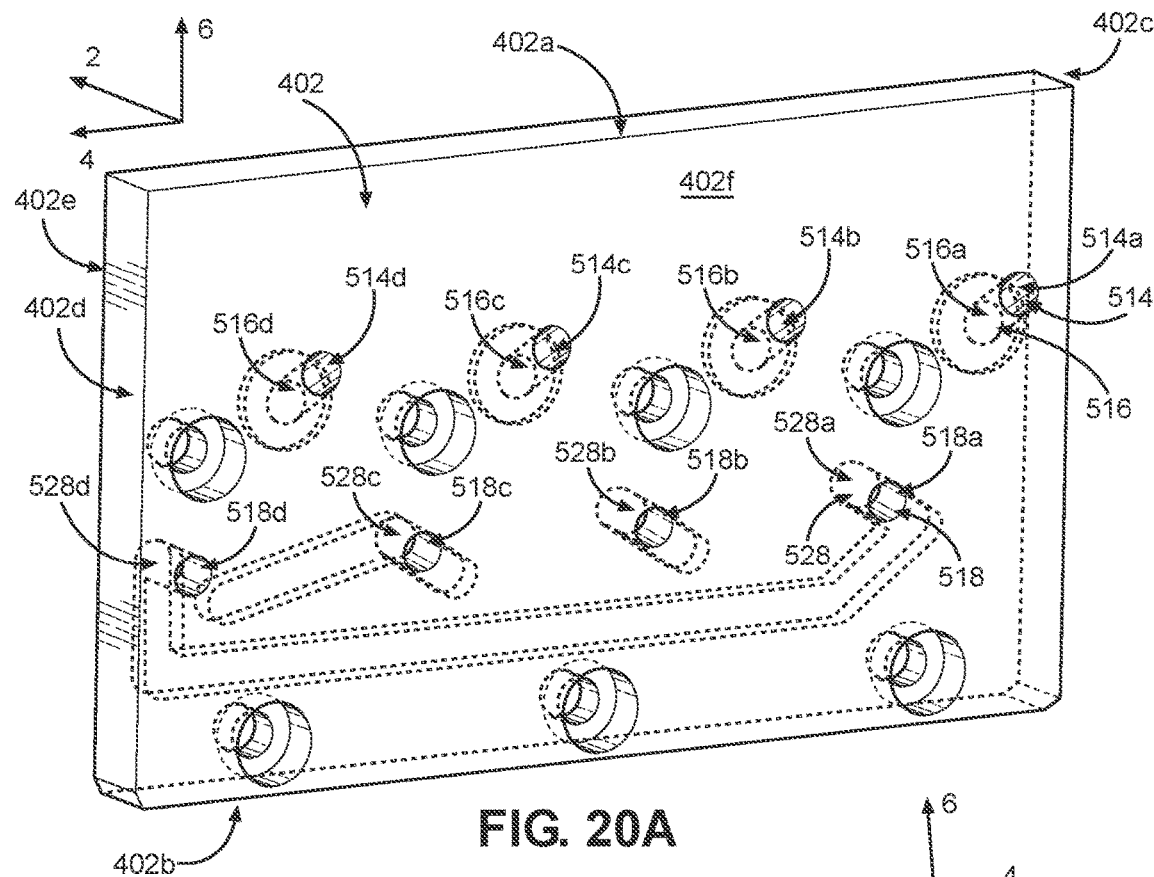
FIG. 20A is a rear perspective view of a second piece of the diverter plate shown in FIG. 18.
Figure 20B:
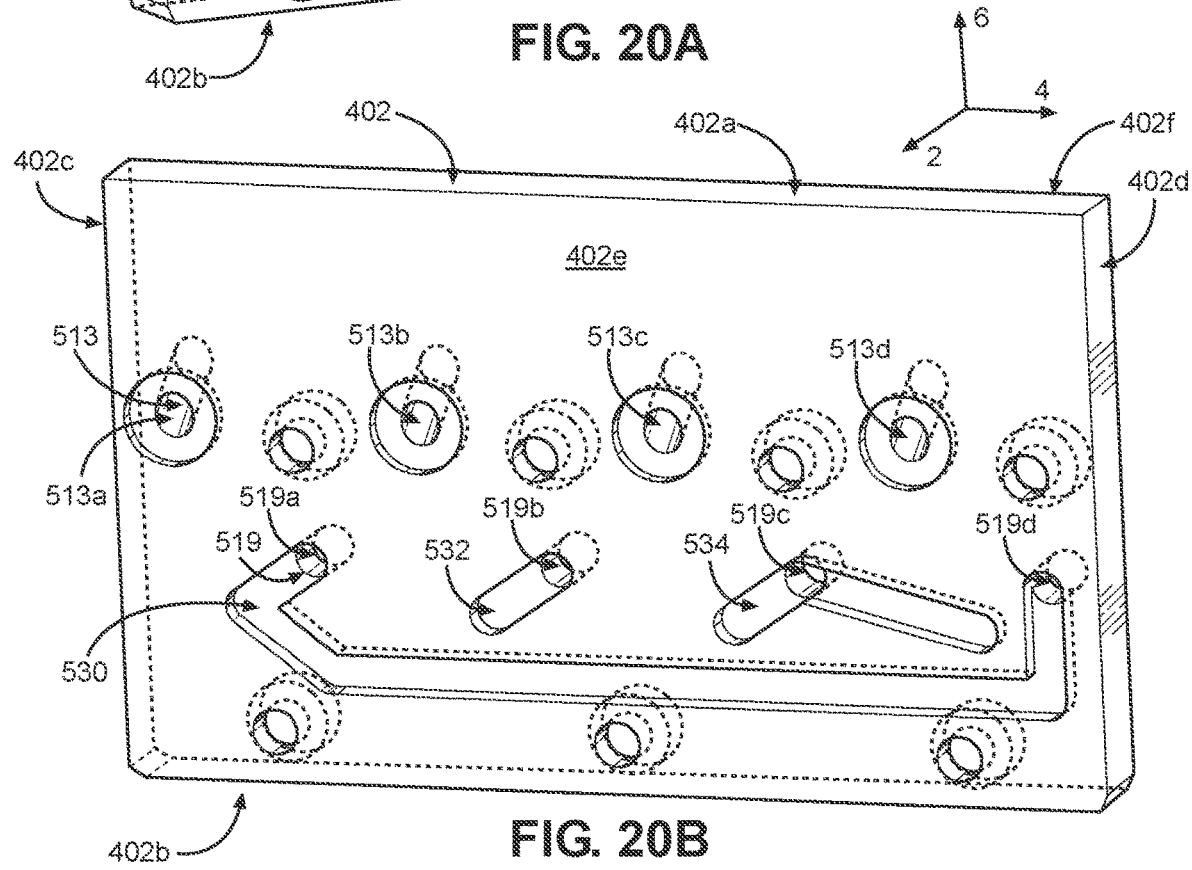
FIG. 20B is a front perspective view of the second piece of the diverter plate shown in FIG. 18.

Continuing with FIGS. 20A-20B, the second piece 402 of the diverter plate 400 can have a top surface 402a, a bottom surface 402b opposite the top surface 402a, a first side surface 402c, a second side surface 402d opposite the first side surface 402c, a front surface 402e, and a back surface 402f opposite the front surface 402e. The second piece 402 defines a plurality of pump channels 516a-516d that extend from the front surface 402e of the second piece 402 to the back surface 402f. Though the second piece 402 is shown as defining four pump channels 516, more or less can be defined as desired. Each of the pump channels 516a-516d extends from a respective input opening 513a-513d defined by the front surface 402e of the second piece 402 to a respective output opening 514a-514d defined by the rear surface 402f of the second piece 402. As a result, the second piece 402 is depicted as including four input openings 513 and four output opening 514. However, the second piece 402 can include more or less input openings 513 and/or output openings 514 as desired, such that any of the pump channels 516 can extend between multiple input openings 513 and/or multiple output openings 514.

The second piece 402 of the diverter plate 400 also defines a plurality of input channels 528a-528d that extend from the front surface 402e of the second piece 402 to the back surface 402f. Though the second piece is shown as defining four input channels 528, more or less can be defined as desired. Each of the input channels 528a-528d extends from a respective input opening 518a-518d defined by the back surface 402f of the second piece 402 to a respective output opening 519a-519d defined by the front surface 402e of the second piece 402. As a result, the second piece 402 is depicted as including four input opening 518 and four output openings 519. However, the second piece 402 can include more or less input openings 518 and/or output openings 519 as desired, such that any of the input channels 528a-528d can extend between multiple input openings 518 and/or multiple output openings 519.

The second piece 402 also defines multiple diverter channels, including a first diverter channel 530, a second diverter channel 532, and a third diverter channel 534. Each of the diverter channel 530, 532, and 534 extends into the front surface 402e of the second piece 402 into the body of the second piece 402, and is in communication with certain ones of the input channels 528a-528d. For example, the first diverter channel 530 is in communication with the first and fourth input channels 528a and 528d, the second diverter channel 532 is in communication with the second input channel 528b, and the third diverter channel 534 is in communication with the third input channel 528c. However, each of these diverter channels 530, 532, and 534 can be differently configured to communicate with different ones of the input channels 528a-528d.

When the first and second pieces 401 and 402 are attached to define the assembled diverter plate 400 and the diverter plate 400 is inserted into the applicator 10, the pump channels 416a-416d of the first piece 401 are in fluid communication with respective ones of the pump channels 516a-516d of the second piece 402. For example, the output openings 414a-414d of the pump channels 416a-416d are adjacent respective ones of the input openings 513a-513d of the pump channels 516a-516d. As a result, the pump channels 416a-416d and 516a-516d are configured to provide a path for adhesive to flow from the supply channel 200 of the applicator 10 to the pump assemblies 20. Specifically, adhesive can flow from the supply channel 200 and the first input channel 204, through the pump channels 416 of the first piece 401, through the pump channels 516 of the second piece 402, and to the pump assemblies 20.

Further, when the first and second pieces 401 and 402 are attached to define the assembled diverter plate 400, the input channels 528a-528d are in communication with the output channels 424a-424d through the diverter channels 530, 532, and 534. In particular, when the diverter plate 400 is assembled, the back surface 401f of the first piece 401 engages the front surface 402e of the second piece 402 and the diverter channels 530, 532, and 534 are partially defined by the back surface 401f of the first piece 401, such that the first and second pieces 401 and 402 jointly define a complete closure that allows adhesive to travel through the diverter channels 530, 532, and 534 without leaking. As shown, the first diverter channel 530 is in communication with the first and fourth input channels 528a and 528d of the second piece 402 and the first output channel 424a of the first piece 401. The second diverter channel 532 is in communication with the second input channel 528b of the second piece 402 and the second output channel 424b of the first piece 401. The third diverter channel 534 is in communication with the third input channel 528c of the second piece 402 and the third and fourth output channels 424c and 424d of the first piece 401. As shown, the relationship between the number of input channels 528 to the number of output channels 424 a particular diverter channel is in communication with is not necessarily one to one. As a result, when the diverter plate 400 is fully assembled, adhesive can flow from pump assemblies 20, through the input channels 528a-528d of the second piece 402, through the diverter channels 530, 532, and 534, through the output channels 424a-424d of the first piece 401, and to the dispensing modules 16.

An input channel 528 and an output channel 424 that are in fluid communication through one of the diverter channels 530, 532, and 534 can collectively be referred to as a diverter passage, such that a single diverter passage can include on input channel 528 and one output channel 424. However, a single diverter passage can alternatively include a plurality of input channels 528 and/or a plurality of output channels 424.

This multi-piece construction can increase flexibility for combining and splitting adhesive flows through the diverter plate 400, and can allow the diverter plate 400 to accommodate more adhesive channels than can be formed in a diverter plate with a unitary body that includes cross-drilled holes. Further, a multi-piece construction allows only a portion of the diverter plate 400 to be replaced if desired upon transitioning to a new dispensing operation. For example, an operator can elect to replace only the first piece 401 or the second piece 402, rather than the entire diverter plate 400.

Figure 21:
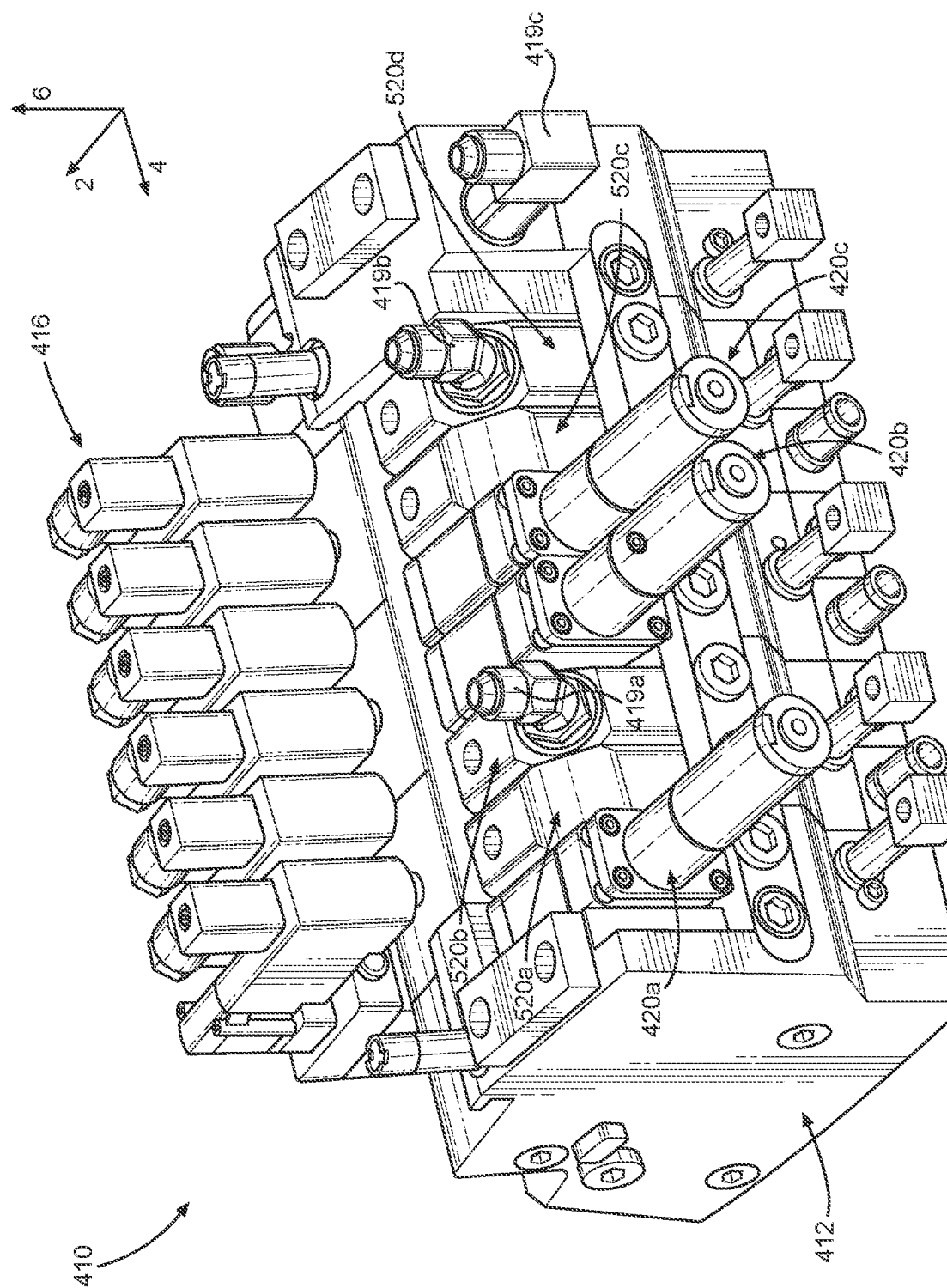
FIG. 21 is a front perspective view of an applicator according to another embodiment of the present invention.

Another embodiment of the present disclosure is a hybrid applicator for dispensing the adhesive. FIG. 21 illustrates an applicator 410. The hybrid applicator 410 is configured for both metered output and pressure fed output. The applicator 410 is similar to the applicator 10 described above. For instance, the hybrid applicator 410 includes dispensing module(s) 416 and a unitary or segmented manifold 412.

The hybrid applicator 410 includes at least one pump assembly 420 (or pump assembly 120) and at least one pressure feed block 520, each of which is coupled to the manifold 412. Regarding this embodiment, reference number 420 can be used interchangeably with the reference number 420a-420c unless noted otherwise. In accordance with the embodiment illustrated in FIG. 15, the applicator 10 includes three pump assemblies 420a, 420b and 420c, as well as four pressure feed blocks 520a, 520b, 520c and 520d. However, the applicator 410 can include any number of pump assemblies 420 and pressure feed blocks 520. Any of the pump assemblies 420a-420c can be configured to operate as the recirculation pump assembly, as described in relation to pump assembly 20g above.

Continuing with FIG. 21, the pump assembly 420 is substantially the same as pump assembly 20 (or pump assembly 120), as described above. The pump assembly 420 receives adhesive from flow channels in the manifold 412, which are ported to the input 419c. Pressure feed blocks 520a and 520c include inlets and outlets that receive adhesive from the manifold supplied through the input 419c. The pressure feed blocks 520b and 520d are supplied adhesive through inputs 419a and 419b, which receive adhesive from an adhesive supply (not shown). A pump (not shown) near the adhesive supply may be used to feed the adhesive through hoses to inputs 419a and 419b, which are coupled to the pressure feed blocks 520b and 520d, respectively. Heat from the manifold 412 then is transferred to the pressure feed blocks 520a-520d, thereby heating the adhesive within the pressure feed block 520. As shown, the hybrid applicator 410 has multiple input fittings 419a-419c, some which are associated with a pressure feed block(s), that can be used to supply different types of adhesive to the applicator 410.

Combining a pump assembly 420 with a pressure feed block 520 increases process flexibility of the applicator 410. For example, the pump assembly 420 permits precise metering of adhesive streams from the dispensing module 416, while other adhesive streams are associated with the less precise pressure feed blocks 520. It should be appreciated that the hybrid applicator 410 can be metered, pressure-fed, and multi-zone pressure-fed, all within a single manifold as needed.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. An applicator for dispensing multiple adhesives on a substrate, the applicator comprising:
    a manifold comprising:
        a first dispensing module having a first inlet and a first nozzle, the first inlet configured to receive a first adhesive, and the first nozzle configured to apply the first adhesive to the substrate; and
        a second dispensing module adjacent the first dispensing module, the second dispensing module having a second inlet and a second nozzle, the second inlet configured to receive a second adhesive that is different from the first adhesive, and the second nozzle configured to apply the second adhesive to the substrate;
    a first pump having an inlet and an outlet, the first inlet of the first dispensing module being configured to receive the first adhesive from the outlet of the first pump; and
    a first pressure feed block having an inlet and an outlet, the inlet of the first pressure feed block being in fluid communication with a source of the second adhesive, the second inlet of the second dispensing module being configured to receive the second adhesive from the outlet of the first pressure feed block.

2. The applicator of claim 1, wherein the inlet of the first pressure feed block comprises an input fitting that is configured to be connected to a hose that is in fluid communication with the source of the second adhesive.

3. The applicator of claim 2, wherein the second adhesive in the hose is pressurized.

4. The applicator of claim 2, wherein:
the manifold has a manifold input that is configured to receive the first adhesive from a source of the first adhesive, and
the inlet of the first pump is in fluid communication with the manifold input to receive the first adhesive.

5. The applicator of claim 4, wherein the manifold input comprises an input fitting that is configured to be connected to a hose that is in fluid communication with the source of the first adhesive.

6. The applicator of claim 5, wherein the first adhesive in the hose is unpressurized.

7. The applicator of claim 4, wherein:
the manifold further comprises a third dispensing module having a third inlet and a third nozzle, the third inlet configured to receive the first adhesive, and the third nozzle configured to apply the first adhesive to the substrate,
the manifold further comprises a second pump having an inlet and an outlet, and
the third inlet of the third dispensing module receives the first adhesive from the outlet of the second pump.

8. The applicator of claim 7, wherein:
the manifold defines a supply channel that is in fluid communication with the manifold input, the inlet of the first pump, and the inlet of the second pump,
the inlet of the first pump receives the first adhesive from the supply channel, and
the inlet of the second pump receives the first adhesive from the supply channel.

9. The applicator of claim 1, wherein the second dispensing module is directly adjacent the first dispensing module.

10. The applicator of claim 1, wherein the manifold is a unitary manifold.

11. An applicator for dispensing multiple adhesives on a substrate, the applicator comprising:
a manifold comprising:
a first dispensing module having a first inlet and a first nozzle, the first inlet configured to receive a first adhesive, and the first nozzle configured to apply the first adhesive to the substrate;
a second dispensing module adjacent the first dispensing module, the second dispensing module having a second inlet and a second nozzle, the second inlet configured to receive a second adhesive that is different from the first adhesive, and the second nozzle configured to apply the second adhesive to the substrate; and
a third dispensing module having a third inlet and a third nozzle, the third inlet configured to receive the first adhesive, and the third nozzle configured to apply the first adhesive to the substrate;
a first pump having an inlet and an outlet, the first inlet of the first dispensing module configured to receive the first adhesive from the outlet of the first pump;
a second pump having an inlet and an outlet;
a manifold input that is configured to receive the first adhesive from a source of the first adhesive;
a supply channel that is in fluid communication with the manifold input, the inlet of the first pump, and the inlet of the second pump;
a recirculation channel; and
a recirculation pump having an inlet and an outlet, the recirculation pump being different from the first pump and the second pump,
the third inlet of the third dispensing module being configured to receive the first adhesive from the outlet of the second pump,
the inlet of the first pump being in fluid communication with the manifold input to receive the first adhesive,
the inlet of the first pump being configured to receive the first adhesive from the supply channel,
the inlet of the second pump being configured to receive the first adhesive from the supply channel,
the inlet of the recirculation pump being in fluid communication with the recirculation channel, and
the outlet of the recirculation pump being in fluid communication with the supply channel.

12. An applicator for dispensing multiple adhesives on a substrate, the applicator comprising:
a manifold comprising:
a first dispensing module having a first inlet and a first nozzle, the first inlet configured to receive a first adhesive, and the first nozzle configured to apply the first adhesive to the substrate; and
a second dispensing module adjacent the first dispensing module, the second dispensing module having a second inlet and a second nozzle, the second inlet configured to receive a second adhesive that is different from the first adhesive, and the second nozzle configured to apply the second adhesive to the substrate;
a third dispensing module having a third inlet and a third nozzle, the third inlet configured to receive the first adhesive, and the third nozzle configured to apply the first adhesive to the substrate;
a first pump having an inlet and an outlet, the first inlet of the first dispensing module configured to receive the first adhesive from the outlet of the first pump;
a second pump having an inlet and an outlet;
a manifold input that is configured to receive the first adhesive from a source of the first adhesive;
a supply channel that is in fluid communication with the manifold input, the inlet of the first pump, and the inlet of the second pump; and
a flow diverter plate that defines a body having a first surface in fluid communication with the first pump and the second pump, and a second surface opposite the first surface in fluid communication with the first dispensing module and the third dispensing module,
the third inlet of the third dispensing module being configured to receive the first adhesive from the outlet of the second pump,
the inlet of the first pump being in fluid communication with the manifold input to receive the first adhesive,
the inlet of the first pump being configured to receive the first adhesive from the supply channel,
the inlet of the second pump being configured to receive the first adhesive from the supply channel,
the flow diverter plate defines a pump channel extending from the first surface to the second surface, and
the flow diverter plate further defines a plurality of diverter passages extending from the first surface to the second surface.

13. The applicator of claim 12, wherein:
each of the plurality of diverter passages has a first opening on the first surface and a second opening on the second surface,
the first opening of each diverter passage is in fluid communication with the outlet of the first pump or the outlet of the second pump, and
the second opening of each diverter passage is in fluid communication with the first inlet of the first dispensing module or the third inlet of the third dispensing module.

14. The applicator of claim 12, wherein:
the pump channel has a third opening on the second surface and a fourth opening on the first surface,
the third opening is in fluid communication with the supply channel, and
the fourth opening is in fluid communication with the inlet of the first pump or the inlet of the inlet of the second pump.

15. The applicator of claim 12, wherein the plurality of diverter passages, the pump channel, or both the plurality of diverter passages and the pump channel can be blocked such that the adhesive cannot pass therethrough.

16. The applicator of claim 12, wherein the flow diverter plate is removably received within the manifold.

17. The applicator of claim 12, wherein the flow diverter plate comprises a first piece and a second piece removably coupled to the first piece.

18. The applicator of claim 12, wherein each of the plurality of diverter passages extends along a nonlinear axis from the first surface to the second surface.

\* \* \* \* \*